(12) United States Patent
Severson

(10) Patent No.: US 10,879,829 B2
(45) Date of Patent: Dec. 29, 2020

(54) BEARINGLESS ELECTRICAL MACHINE WITH FLOATING CAPACITOR

(71) Applicant: Wisconsin Alumni Research Foundation, Madison, WI (US)

(72) Inventor: Eric Loren Severson, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 16/414,880

(22) Filed: May 17, 2019

(65) Prior Publication Data
US 2019/0356260 A1 Nov. 21, 2019

Related U.S. Application Data

(60) Provisional application No. 62/673,881, filed on May 19, 2018.

(51) Int. Cl.
*H02P 27/08* (2006.01)
*H02K 11/33* (2016.01)
(Continued)

(52) U.S. Cl.
CPC .............. *H02P 27/08* (2013.01); *H02K 1/16* (2013.01); *H02K 5/225* (2013.01); *H02K 7/003* (2013.01);
(Continued)

(58) Field of Classification Search
None
See application file for complete search history.

(56) References Cited

U.S. PATENT DOCUMENTS

| 5,373,223 A | * | 12/1994 | Akagi | ................. H02M 5/4585 |
| | | | | 318/722 |
| 6,034,456 A | | 3/2000 | Osama et al. | |

(Continued)

FOREIGN PATENT DOCUMENTS

| CN | 105281522 A | * | 1/2016 |
| WO | WO 2016/127147 | | 8/2016 |

OTHER PUBLICATIONS

Severson et al., Practical Implementation of Dual Purpose No Voltage Drives for Bearingless Motors, University of Minnesota, Dept. of Electrical and Computer Engineering presentation, Mar. 18, 2015, 41 pages.

(Continued)

*Primary Examiner* — Bickey Dhakal
(74) *Attorney, Agent, or Firm* — Bell & Manning, LLC

(57) ABSTRACT

A machine drive includes a suspension force inverter, a torque inverter, and a capacitor. The suspension force inverter provides suspension force electrical signals to suspension force electrical terminals. Each suspension force electrical terminal connects to a suspension coil of a stator winding. Each suspension force electrical signal provides a phase to a single suspension force electrical terminal. A single stator winding is associated with each phase. The torque inverter provides torque electrical signals to torque electrical terminals. Each torque electrical signal provides the phase to a single torque electrical terminal. Each torque electrical terminal connects to both the suspension coil and a torque coil of the single stator winding of the associated phase. The capacitor connected in parallel across the suspension force inverter. The torque inverter is connected to a voltage source. The capacitor is connected to the voltage source through the torque invertor and the suspension force inverter.

20 Claims, 19 Drawing Sheets

(51) Int. Cl.
  H02K 11/00    (2016.01)
  H02K 7/00     (2006.01)
  H02K 5/22     (2006.01)
  H02K 1/16     (2006.01)
  H02M 7/5387   (2007.01)
(52) U.S. Cl.
  CPC ......... *H02K 11/0094* (2013.01); *H02K 11/33* (2016.01); *H02M 7/53871* (2013.01)

(56) References Cited

U.S. PATENT DOCUMENTS

| | | | |
|---|---|---|---|
| 6,078,119 | A | 6/2000 | Satoh et al. |
| 6,166,469 | A | 12/2000 | Osama et al. |
| 7,667,418 | B2 | 2/2010 | Kascak et al. |
| 7,800,331 | B2 | 9/2010 | Shakrabarti et al. |
| 9,515,531 | B2 | 12/2016 | Jansen et al. |
| 2003/0085627 | A1* | 5/2003 | Lipo ................... H02P 25/22 310/12.22 |
| 2004/0222754 | A1* | 11/2004 | Ochiai .................. H02P 1/54 318/105 |
| 2005/0077793 | A1 | 4/2005 | Garvey et al. |
| 2007/0216244 | A1 | 9/2007 | Edelson |
| 2010/0231076 | A1 | 9/2010 | Chiba et al. |
| 2012/0319542 | A1* | 12/2012 | Hazeyama ............ H02K 11/33 310/68 D |
| 2013/0134803 | A1 | 5/2013 | Goepel |
| 2017/0302145 | A1 | 10/2017 | Holenstein et al. |

OTHER PUBLICATIONS

Severson et al., Design of Dual Purpose No Voltage Combined Windings for Bearingless Motors, University of Minnesota, Dept. of Electrical and Computer Engineering and Norwegian University of Science and Technology presentation, Sep. 22, 2016, 36 pages.
Oishi et al. "A Novel Parallel Motor Winding Structure for Bearingless Motors," IEEE Transactions on Magnetics, vol. 49, No. 5, May 2013, pp. 2287-2290.
Severson et al., "Design of Dual Purpose No Voltage Combined Windings for Bearingless Motors," IEEE 2016, 10 pages.
Severson et al., "Practical Implementation of Dual Purpose No Voltage Drives for Bearingless Motors," IEEE 2015, pp. 819-826.
Eric Loren Severson, "Bearingless AC Homopolar Machine Design and Control for Distributed Flywheel Energy Storage" A Dissertation Submitted to the Faculty of the Graduate School of the University of Minnesota, Jun. 2015, 210 pages.
Waheed Ahmed and Syed M Usman Ali "Comparative study of SVPWM (space vector pulse width modulation) & SPWM (sinusoidal pulse width modulation) based three phase voltage source inverters for variable speed drive" 2013 IOP Conf. Ser.: Mater. Sci. Eng. 51 Jan. 2, 2007.

* cited by examiner

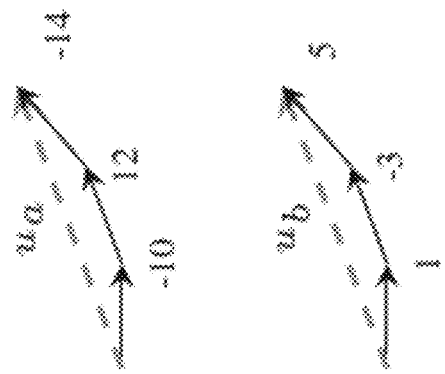
FIG. 8A
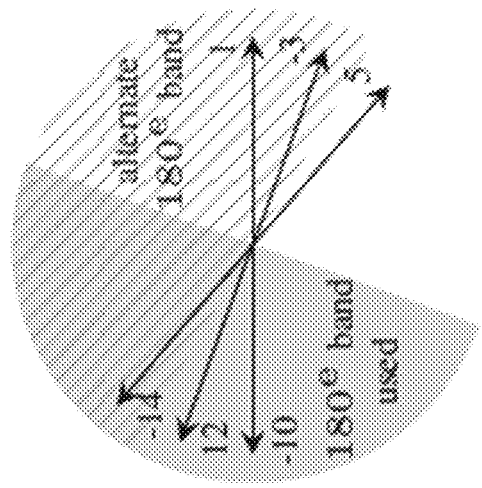
FIG. 8B
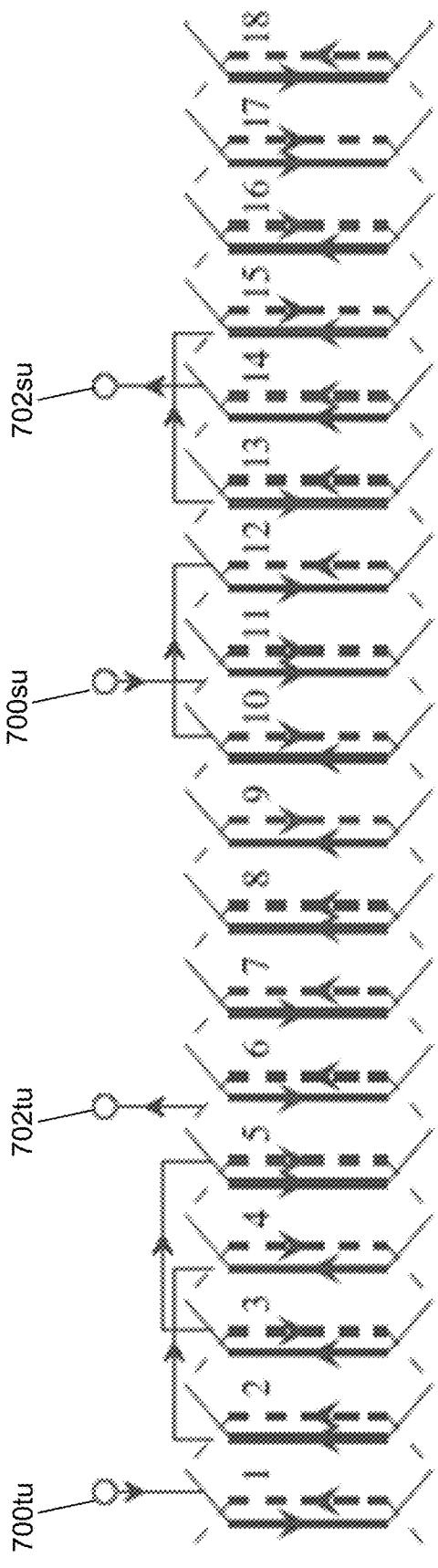
FIG. 8C
FIG. 8D

BEARINGLESS ELECTRICAL MACHINE WITH FLOATING CAPACITOR

CROSS REFERENCE TO RELATED APPLICATIONS

The present application claims the benefit of 35 U.S.C. § 119(e) to U.S. Provisional Patent Application No. 62/673,881 filed May 19, 2018, the entire contents of which are hereby incorporated by reference.

BACKGROUND

Bearingless motors provide the functionality of a magnetic bearing and a motor in a single electric machine. Compared to systems that utilize a motor with separate magnetic bearings, bearingless technology results in a more integrated system which requires less raw material and can be designed for higher speeds due to shorter shaft lengths. Applications range from low speed, hygienic mixing devices, pumps, and artificial hearts to high and ultra-high speed machines for flywheels, spindle tools, and turbomachinery, etc. Bearingless motors have been widely developed as both asynchronous and synchronous motors, such as permanent magnet, synchronous reluctance, induction, consequent pole, and ac homopolar motors.

Legacy bearingless motor designs utilize two separate windings: one winding for producing torque, and a second winding for producing suspension force. These two windings compete for the available stator slot space, which creates a design trade-off between the machine's motor performance and its magnetic suspension performance. Many implementations of bearingless motors require relatively small suspension forces during normal operation and large forces during certain events. However, the suspension winding must be sized for a worst-case force requirement, which in most bearingless machines is much larger than the force required during normal operation. During normal operation, such machines effectively waste slot space that could otherwise carry torque current. Furthermore, to create radial forces, the suspension winding carries current to cancel torque winding current in certain slots, causing increased copper loss. Finally, having separate windings requires each slot to carry a large number of coil sides (4 coil sides for double-layer windings), which reduces the packing factor and increases manufacturing cost and complexity. For these reasons, recent efforts have been directed to combining the suspension and torque winding into a single winding. Such a winding is referred to as a "dual purpose" or a combined winding herein. While combined winding designs have been successful in increasing the machine performance, they add substantial cost and complexity to the power electronics required for the bearingless drive system.

SUMMARY

In an example embodiment, a machine drive is provided that includes, but is not limited to, a suspension force inverter, a torque inverter, and a capacitor. The suspension force inverter is configured to provide a plurality of suspension force electrical signals to a plurality of suspension force electrical terminals. Each suspension force electrical terminal is configured for connection to a suspension coil of a stator winding. Each suspension force electrical signal of the plurality of suspension force electrical signals is configured to provide a phase of a plurality of phases to a single suspension force electrical terminal of the plurality of suspension force electrical terminals. A single stator winding is associated with each phase the plurality of phases. The torque inverter is configured to provide a plurality of torque electrical signals to a plurality of torque electrical terminals. Each torque electrical signal of the plurality of torque electrical signals provides the phase of the plurality of phases to a single torque electrical terminal of the plurality of torque electrical terminals. Each torque electrical terminal is configured for connection to both the suspension coil and a torque coil of the single stator winding of the associated phase. The capacitor is connected in parallel across the suspension force inverter. The torque inverter is configured for connection to a voltage source. The capacitor is connected to the voltage source through the torque invertor and the suspension force inverter.

In another example embodiment, a bearingless electrical machine is provided that includes, but is not limited to, a stator, a rotor, a stator winding for each phase of a plurality of phases, and the machine drive. The stator includes, but is not limited to, a plurality of teeth. A slot is positioned between a pair of the plurality of teeth. The stator is mounted on a first side of the rotor separated by an air gap between a surface of the rotor and a tooth of the plurality of teeth. Each stator winding is wound about the plurality of teeth to form a first number of pole pairs between a first pair of terminals for each phase of the plurality of phases and to form a second number of pole pairs between a second pair of terminals for each phase of the plurality of phases. $p_s=1$ or $p_s=p\pm1$, where p is the first number of pole pairs and $p_s$ is the second number of pole pairs. A torque coil of the stator winding for each phase of the plurality of phases is connected between the first pair of terminals for a respective phase of the plurality of phases. A suspension coil of the stator winding for each phase of the plurality of phases is connected between the second pair of terminals for the respective phase of the plurality of phases. The machine drive includes, but is not limited to, a suspension force inverter, a torque inverter, and a capacitor. The suspension force inverter is configured to provide a suspension force electrical signal for each phase of the plurality of phases to the suspension coil of the stator winding for the respective phase of the plurality of phases. The torque inverter configured to provide a torque electrical signal for each phase of the plurality of phases to the torque coil and to the suspension coil of the stator winding for the respective phase of the plurality of phases. The capacitor is connected in parallel across the suspension force inverter. The torque inverter is configured for connection to a voltage source. The capacitor is connected to the voltage source through the torque invertor and the suspension force inverter.

In another example embodiment, a bearingless electrical machine system is provided that includes, but is not limited to, a shaft configured to rotate, a rotor mounted to the shaft to rotate with the shaft, a stator, a stator winding for each phase of a plurality of phases, the machine drive, and a motor controller. The stator includes, but is not limited to, a plurality of teeth. A slot is positioned between a pair of the plurality of teeth. The stator is mounted on a first side of the rotor separated by an air gap between a surface of the rotor and a tooth of the plurality of teeth. Each stator winding is wound about the plurality of teeth to form a first number of pole pairs between a first pair of terminals for each phase of the plurality of phases and to form a second number of pole pairs between a second pair of terminals for each phase of the plurality of phases. $p_s=1$ or $p_s=p\pm1$, where p is the first number of pole pairs and $p_s$ is the second number of pole pairs. A torque coil of the stator winding for each phase of the plurality of phases is connected between the first pair of terminals for a respective phase of the plurality of phases. A suspension coil of the stator winding for each phase of the plurality of phases is connected between the second pair of terminals for the respective phase of the plurality of phases. The machine drive includes, but is not limited to, a suspension force inverter, a torque inverter, and a capacitor. The suspension force inverter is configured to provide a suspension force electrical signal for each phase of the plurality of phases to the suspension coil of the stator winding for the respective phase of the plurality of phases. The torque inverter configured to provide a torque electrical signal for each phase of the plurality of phases to the torque coil and to the suspension coil of the stator winding for the respective phase of the plurality of phases. The capacitor is connected in parallel across the suspension force inverter. The torque inverter is configured for connection to a voltage source. The capacitor is connected to the voltage source through the torque invertor and the suspension force inverter. The motor controller includes, but is not limited to, a processor configured to determine the suspension force electrical signal input to the suspension force inverter to regulate a voltage on the capacitor to provide a power flow into the suspension coil of the stator winding for each phase of the plurality of phases to maintain the air gap between the rotor and the stator.

Other principal features of the disclosed subject matter will become apparent to those skilled in the art upon review of the drawings described below, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 8A-8D depict design steps for determining a winding arrangement for the machine of FIG. 1 in accordance with an illustrative embodiment.

DETAILED DESCRIPTION

Figure 1:
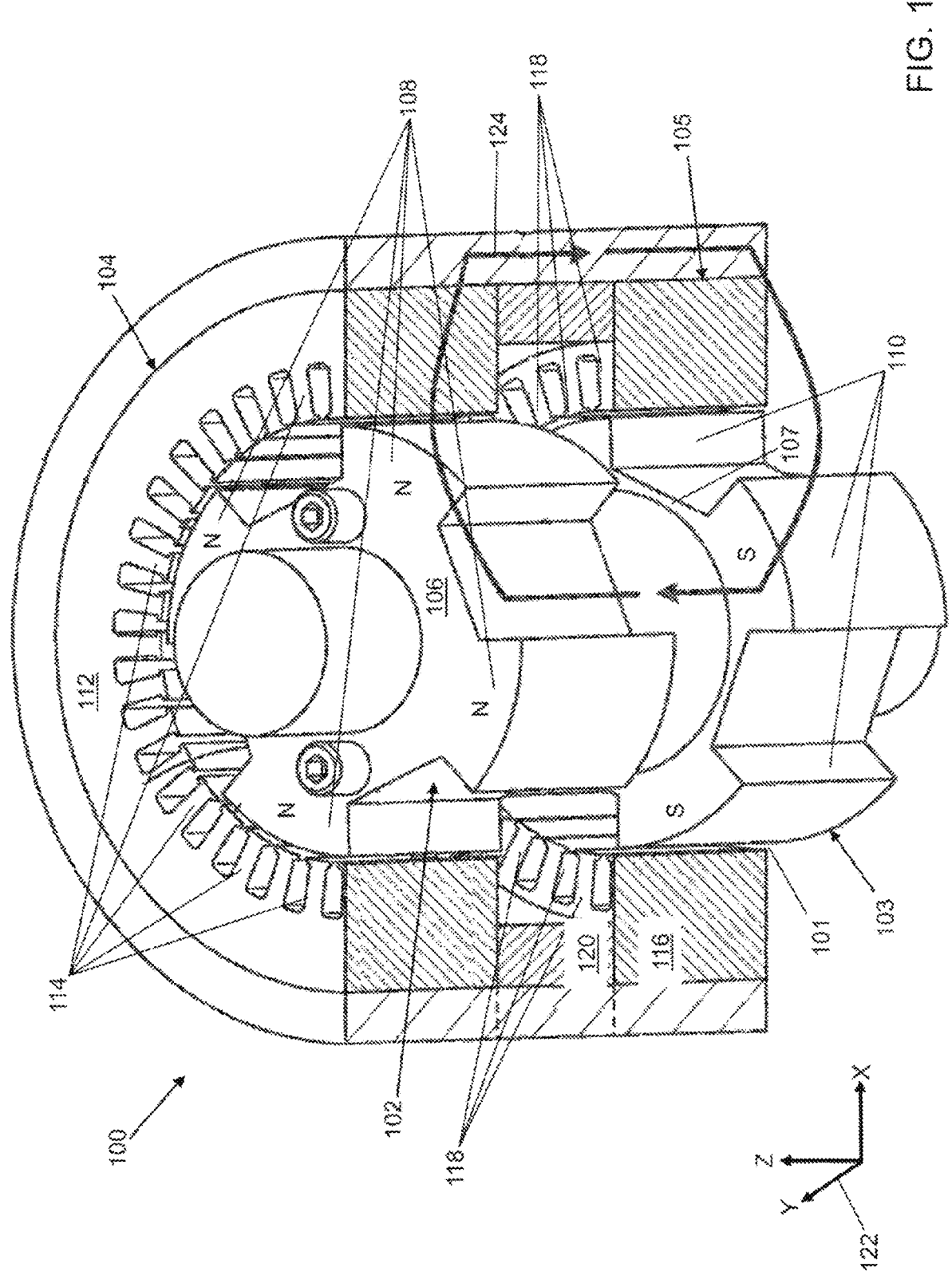
FIG. 1 depicts a front perspective view of a radial flux machine in accordance with an illustrative embodiment.
Figure 2:
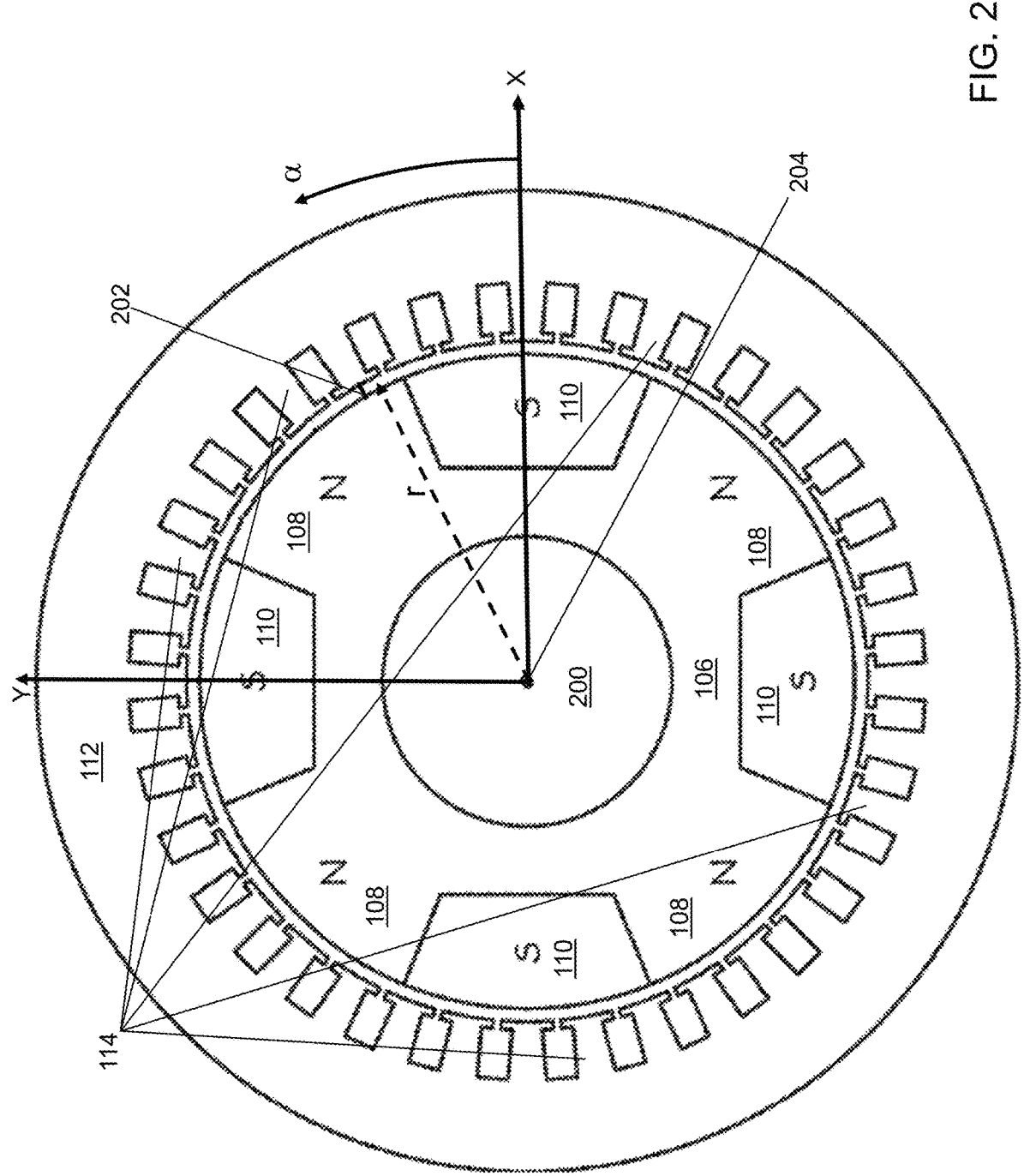
FIG. 2 depicts a top view of the radial flux machine of FIG. 1 in accordance with an illustrative embodiment.
Figure 3:
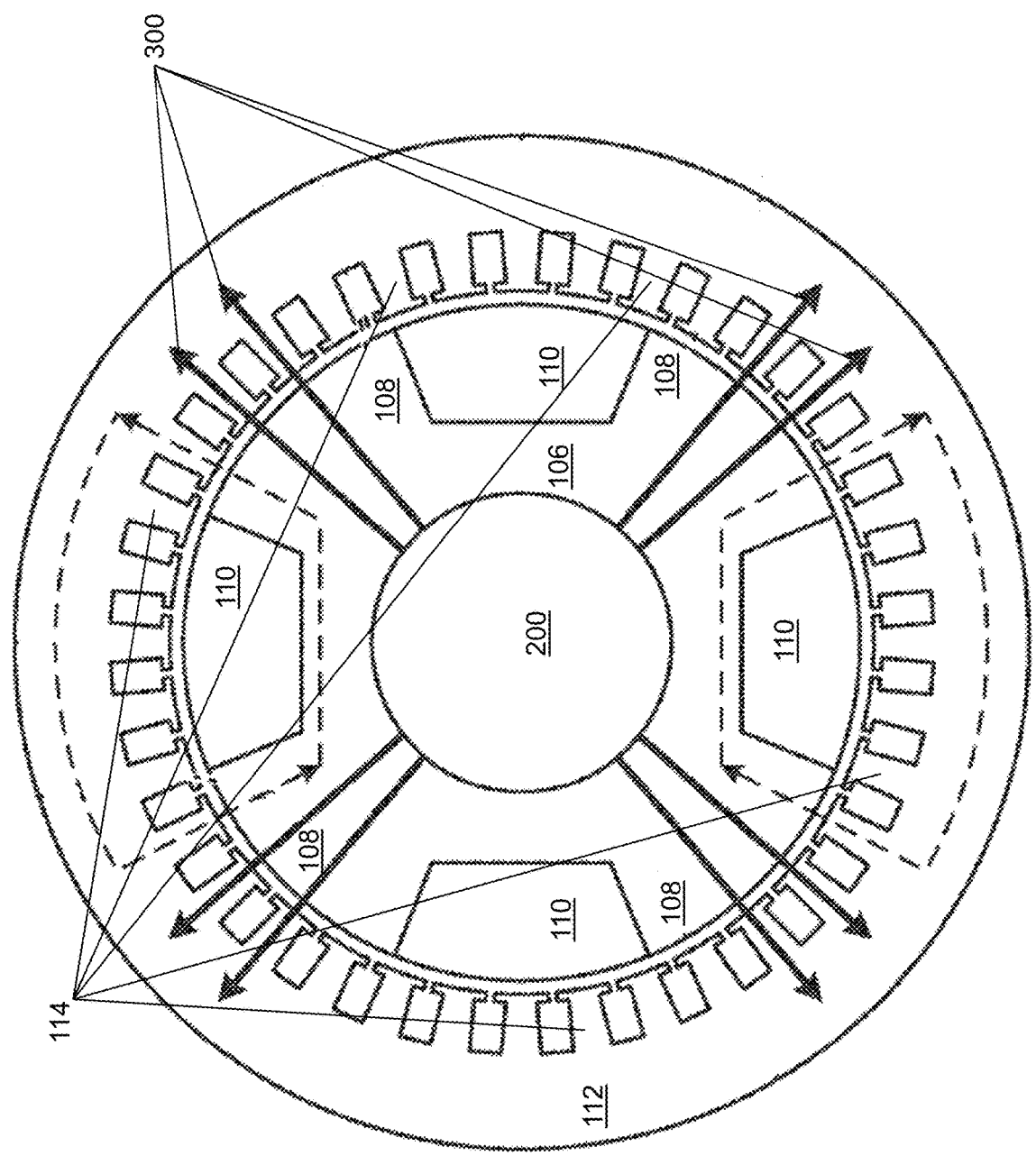
FIG. 3 depicts the top view of the radial flux machine of FIG. 2 showing force fields in accordance with an illustrative embodiment.

Referring to FIG. 1, a front perspective view of a radial flux machine 100 is shown in accordance with an illustrative embodiment. Referring to FIG. 2, a top view of radial flux machine 100 is shown in accordance with an illustrative embodiment. Referring to FIG. 3, the top view of radial flux machine 100 showing a radial force is shown in accordance with an illustrative embodiment. Radial flux machine 100 can be implemented as any type of radial flux machine such as a permanent magnet (PM) machine, a synchronous reluctance machine, an induction machine, a consequent-pole machine, an alternating current (AC) homopolar machine, etc. In the illustrative embodiment of FIG. 1, radial flux machine 100 is an AC homopolar bearingless motor.

In an illustrative embodiment, radial flux machine 100 forms an AC homopolar machine that may include a top rotor 102, a bottom rotor 103, a top stator 104, a bottom stator 105, a field winding 120, and a shaft 200. Top rotor 102 is positioned radially interior of top stator 104 separated by a top air gap 202 that varies circumferentially around top rotor 102 based on a location of poles of top rotor 102. Similarly, bottom rotor 103 is positioned radially interior of bottom stator 105 separated by a bottom air gap 101. In the illustrative embodiment of FIG. 1, top rotor 102 and bottom rotor 103 are mounted interior of top stator 104 and bottom stator 105, respectively, though top stator 104 and bottom stator 105 could instead be mounted interior of top rotor 102 and bottom rotor 103 in an alternative embodiment. Top stator 104, bottom stator 105, and shaft 200 have generally circular cross sections as shown with reference to FIG. 1. In alternative embodiments, radial flux machine 100 can include a fewer or a greater number of stators and rotors depending on the machine type.

Top rotor 102 and bottom rotor 103 are mounted to shaft 200 for rotation with shaft 200. When radial flux machine 100 is operating as a motor, electrical energy provided to top stator 104 and to bottom stator 105 rotates top rotor 102 and bottom rotor 103 and thereby shaft 200. When radial flux machine 100 is operating as a generator, shaft 200 is rotated to generate electrical energy from stator windings of top stator 104 and from bottom stator 105.

Top stator 104 and bottom stator 105 may be formed of a ferromagnetic material such as iron, cobalt, nickel, etc. Top stator 104 may include a top stator core 112 and a top plurality of teeth 114. In the illustrative embodiment, the top plurality of teeth 114 extend from top stator core 112 towards a center 204 of an interior of shaft 200. Top stator slots are formed between successive pairs of the top plurality of teeth 114. In the illustrative embodiment, the top plurality of teeth 114 of top stator 104 includes 36 teeth that define 36 stator slots.

Bottom stator 105 may include a bottom stator core 116 and a bottom plurality of teeth 118. In the illustrative embodiment, the bottom plurality of teeth 118 extend from bottom stator core 116 towards center 204 of the interior of shaft 200. Bottom stator slots are formed between successive pairs of the bottom plurality of teeth 118. In the illustrative embodiment, the bottom plurality of teeth 118 of bottom stator 105 includes 36 teeth that define 36 stator slots.

As understood by a person of skill in the art, top stator 104 and bottom stator 105 may be formed of laminations mounted closely together and stacked in a z-direction indicated by a z-axis and cut to define a shape and a size of top stator core 112 and the top plurality of teeth 114 and of bottom stator core 116 and the bottom plurality of teeth 118. An x-axis is perpendicular to a y-axis, and both the x-axis and the y-axis are perpendicular to the z-axis to form a right-handed coordinate reference frame denoted x-y-z frame 122. The x-y plane defines a cross section of radial flux machine 100 and the z-axis defines a height of radial flux machine 100.

The top plurality of teeth 114 and the bottom plurality of teeth 118 extend from top stator core 112 and from bottom stator core 116 at equal angular intervals and have a common arc length dimension. Each tooth of the top plurality of teeth 114 and of the bottom plurality of teeth 118 may generally form a "T" shape.

Top rotor 102 may be formed of a ferromagnetic material such as iron, cobalt, nickel, etc. Top rotor 102 may include a top rotor core 106 and a plurality of top rotor pole pieces 108 mounted exterior of top rotor core 106. In the illustrative embodiment, the top rotor pole pieces 108 extend outward from top rotor core 106 toward the top plurality of teeth 114 of top stator 104. As understood by a person of skill in the art, top rotor 102 may be formed of laminations mounted closely together and stacked in the z-direction.

Bottom rotor 103 may be formed of a ferromagnetic material such as iron, cobalt, nickel, etc. Bottom rotor 103 may include a bottom rotor core 107 and a plurality of bottom rotor pole pieces 110 mounted exterior of bottom rotor core 107. In the illustrative embodiment, the bottom rotor pole pieces 110 extend outward from bottom rotor core 107 toward the bottom plurality of teeth 118 of bottom stator 105. As understood by a person of skill in the art, bottom rotor 103 may be formed of laminations mounted closely together and stacked in the z-direction.

In the illustrative embodiment, the plurality of top rotor pole pieces 108 and the plurality of bottom rotor pole pieces 110 have a generally polygonal shape with a curved exterior surface adjacent top stator 104 and bottom stator 105, respectively, though the plurality of top rotor pole pieces 108 and the plurality of bottom rotor pole pieces 110 may have various shapes based on a type of electrical machine of radial flux machine as understood by a person of skill in the art. In the illustrative embodiment, the plurality of top rotor pole pieces 108 and the plurality of bottom rotor pole pieces 110 each include four pole pieces though a fewer or a greater number of pole pieces may be formed to extend from top rotor core 106 and from bottom rotor core 107, respectively, in alternative embodiments. The plurality of top rotor pole pieces 108 and the plurality of bottom rotor pole pieces 110 include at least two pole pieces.

Field winding 120, or permanent magnets in alternative embodiments, creates a magnetization indicated by a north (N) and a south (S) pole indicator for top rotor 102 and for bottom rotor 103. Field winding 120, or the permanent magnets, create a magnetomotive force resulting in flux that flows along a flux path 124 shown at an instant in time as top rotor 102 and bottom rotor 103 rotate about the z-axis defined through center 200.

Stator windings (not shown in FIGS. 1-3) are wound around the top plurality of teeth 114 and the bottom plurality of teeth 118 and held within the top stator slots and the bottom stator slots, respectively. The stator windings carry a current between a plurality of connectors (not shown in FIGS. 1-3) also called terminals. A single winding may be used for each phase. The windings are wound around the top plurality of teeth 114 and the bottom plurality of teeth 118 using various techniques to form a number of magnetic pole-pairs p between a set of connectors that carry one phase of a plurality of phases of electrical current depending on the winding technique as discussed further below. For example, radial flux machine may include three stator windings with one stator winding for each phase. For three phases designated as u, v, w, a first stator winding is associated with a u-phase, a second stator winding is associated with a v-phase, and a third stator winding is associated with a w-phase.

Top rotor 102 and bottom rotor 103 further may include rotor windings and or permanent magnets in alternative embodiments. When rotated, top rotor 102 and bottom rotor 103 produce a rotating magnetic field. Through an interaction between the magnetic field and currents flowing in the windings a torque is generated to rotate shaft 200 such that radial flux machine 100 operates as a motor. Alternatively, shaft 200 is mechanically rotated, which generates currents flowing in the stator windings such that radial flux machine 100 operates as a generator.

When a bearingless motor is created by adding a suspension winding to a stator that has a separate torque winding, the result is a "separate winding" approach to bearingless windings. Alternatively, dual purpose no voltage (DPNV) windings use the same stator winding for both torque and suspension forces—and are therefore a type of "combined winding".

As described further below, the stator windings can be connected to create a suspension force in top air gap 202 and bottom air gap 101, respectively. For example, a radial suspension force 300 created by the stator windings is shown in accordance with an illustrative embodiment in FIG. 3. As referred to herein, a suspension coil (e.g. a u-phase suspension coil 618su shown referring to FIG. 6) is a portion of a stator winding that is connected to a suspension inverter 604 (shown referring to FIG. 6) and to a torque inverter 602 (shown referring to FIG. 6) for each phase of a plurality of phases, and a torque coil (e.g. a u-phase torque coil 618tu shown referring to FIG. 6) is a portion of the same stator winding that is connected to torque inverter 602 and to a neutral connector 620 (shown referring to FIG. 6) for each phase of a plurality of phases. A drive controller 630 (shown referring to FIG. 6) controls a flow of current through each suspension coil and through each torque coil to rotate shaft 200 to generate a torque and to create a radial suspension force on shaft 200. As a result, each suspension coil and torque coil associated with a phase form a DPNV winding. Each suspension coil and each torque coil may be made up of one or more separate coils.

Radial flux bearingless motors produce radial suspension forces by creating an unsymmetrical flux density in top air gap 202 and/or bottom air gap 101. Non-bearingless machines have symmetry that cancels the radial forces. The forces can be calculated using the Maxwell stress tensor, which for the idealized case of radial fields that do not vary with the axial length (along the z-axis), can be written as $$F_x = \frac{lr}{2\mu_0} \int_0^{2\pi} B_r(\alpha)^2 \cos\alpha d\alpha$$

$$F_y = \frac{lr}{2\mu_0} \int_0^{2\pi} B_r(\alpha)^2 \sin\alpha d\alpha$$

where l is an active axial length, r is the air gap radius, and $B_r$ is a cumulative radial flux density in top air gap 202 and/or bottom air gap 101 at angular location $\alpha$ shown referring to FIG. 2. To create a radial force, $B_r(\alpha)$ contains components that differ in harmonic index by one.

For conventional radial flux machine types, such as PM or induction motors, and assuming that harmonics are neglected, a radial air gap flux density can be defined using $B_T(\alpha) = \hat{B}_T \cos(-p\alpha + \phi_T)$, where p represents the number of pole-pairs of radial flux machine 100, and $\phi_T$ indicates an angular location of a torque producing magnetic field at an instant of time. The magnetic field is composed of a magnetizing field (for example, produced by the PM's or a rotor winding) and an armature reaction field. To transform this type of motor into a bearingless motor, a suspension coil with either $p_s = p+1$ or $p_s = p-1$ pole-pairs can be added, for example, to top stator 104 and to bottom stator 105 in the illustrative embodiment, to produce a radial flux density that differs in harmonic index by one $B_S(\alpha) = \hat{B}_S \cos(-(p\pm 1)\alpha + \phi_S)$, where $\phi_S$ indicates an angular location of a suspension force producing magnetic field at an instant of time and $p_s$ is a number of suspension pole-pairs. Thus, $B_r(\alpha) = \hat{B}_T \cos(-p\alpha + \phi_T) + \hat{B}_S \cos(-(p\pm 1)\alpha + \phi_S)$, which includes a torque flux density portion and a suspension for flux density portion.

The suspension flux density portion is produced by balanced sinusoidal suspension currents $$i'_u = \hat{i}_S \cos\phi_S$$

$$i'_v = \hat{i}_S \cos\left(\phi_S - \frac{2\pi}{3}\right)$$

$$i'_v = \hat{i}_S \cos\left(\phi_S + \frac{2\pi}{3}\right).$$

These currents can be transformed into an equivalent two-phase system using the well-known direct-quadrature (DQ) transformation. If this is done with respect to the angle $\phi_T$, the following constant expressions for the radial force result $$F_x = k_f i_x$$

$$F_y = k_f i_y$$

where $i_x$ and $i_y$ are the two-phase DQ currents, respectively, from the DQ transformation and $k_f = f(\hat{B}_T, \text{geometry})$. Typically, a suspension controller specifies required values of $F_x$ and $F_y$ that are used to determine phase currents via an inverse DQ transformation. Noting that $\phi_T$ increases at a speed of an armature winding frequency, to produce a constant force, the suspension currents have the same frequency as the armature currents.

An AC homopolar bearingless motor and a consequent-pole bearingless motor can be viewed as having a constant radial air gap flux density component that does not vary with the angular position, $B_T(\alpha) = \hat{B}_T$. Radial forces are produced by adding a $p_s = 1$ pole-pair suspension coil to the stator winding, which produces a flux density given by $B_S(\alpha) = \hat{B}_S \cos(-\alpha + \phi_S)$ with the suspension currents as defined previously.

A DQ transformation with $\phi_T = 0$ can be used to transform the suspension currents of the AC homopolar bearingless motor and the consequent-pole bearingless motor into equivalent x-y currents to compute the force expressions as defined above. The same inverse DQ transformation is used to calculate the suspension phase currents again with $\phi_T = 0$. Since $\phi_T = 0$, to produce a constant force, the suspension currents are direct current (DC). Additionally, no information regarding the air gap flux density's location is needed for suspension force creation, which may be an advantage of the AC homopolar bearingless motor and the consequent-pole bearingless motor. For the consequent-pole and AC homopolar motors, this requires $p \geq 4$.

The stator winding is responsible for generating two airgap magnetomotive forces (MMF): a p pole-pair MMF for torque and a $p_s$ pole-pair MMF for suspension forces. While conventional bearingless motors use separate windings for creating each MMF, the DPNV windings use a single winding for creating both MMFs.

Figure 4:
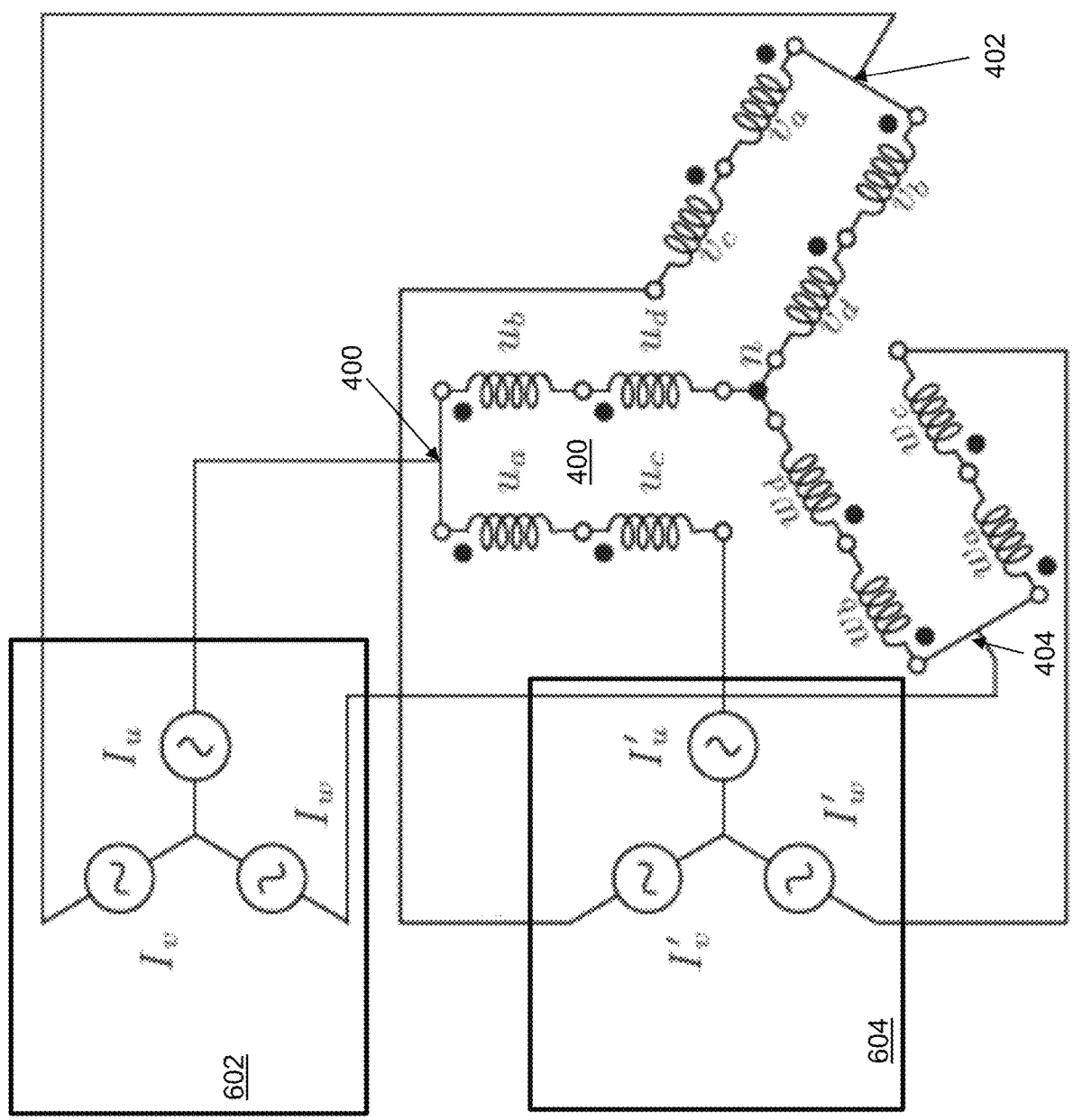
FIG. 4 depicts drive connections for parallel dual purpose no voltage windings in accordance with an illustrative embodiment.

The defining features of a DPNV winding can be summarized as: 1) using the same winding to construct a p polepair torque MMF and a $p_s$ pole-pair suspension MMF; 2) having suspension terminals which connect to the same winding as the torque terminals, but with half of the windings direction reversed so that these terminals experience no motional-electromotive force (EMF). A parallel drive connection is shown in FIG. 4 that includes torque inverter 602 and suspension force inverter 604. The parallel drive connection is shown in FIG. 4 that has suspension coil terminals of a first phase stator winding 400, of a second phase stator winding 402, and of a third phase stator winding 404 appear as a virtual "neutral" meaning that the suspension coil terminals carry half of the torque terminal current in addition to the required radial force-producing suspension current.

The suspension coil(s) and torque coil(s) are connected in series. The current of each coil group is a superposition of the radial force producing suspension currents and half of the torque terminal currents. Based on the amount of suspension current required, the drive actively limits a maximum allowable torque current to avoid exceeding a current rating in any coil group. For this reason, DPNV winding designs are highly advantageous in applications where the amount of required suspension current varies significantly during operation. A machine with a DPNV winding is able to carry a greater torque producing current (and therefore create more torque) during operating times when a low-suspension current is required.

Figure 5A:
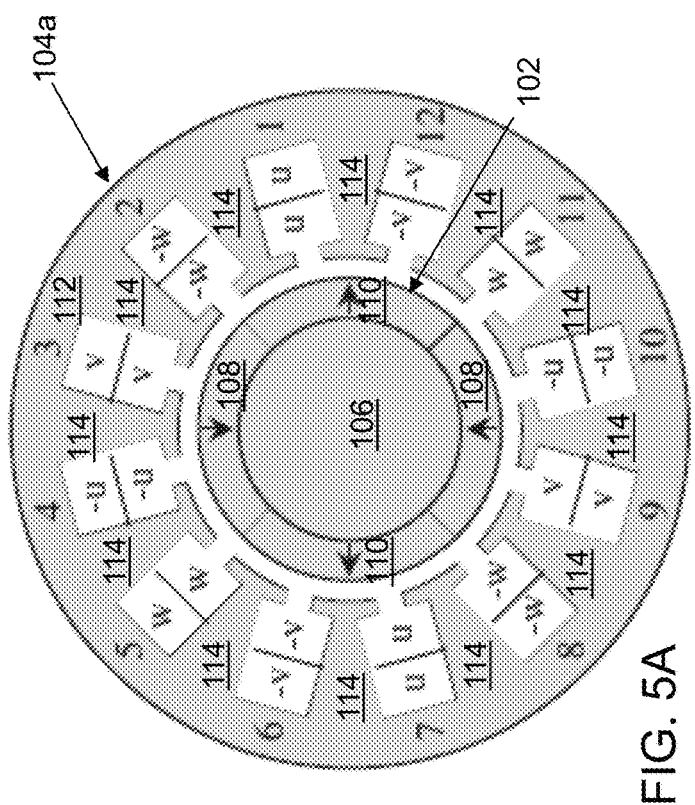
FIG. 5A depicts a top view of the machine of FIG. 1 with windings for a torque excitation in accordance with an illustrative embodiment.
Figure 5B:
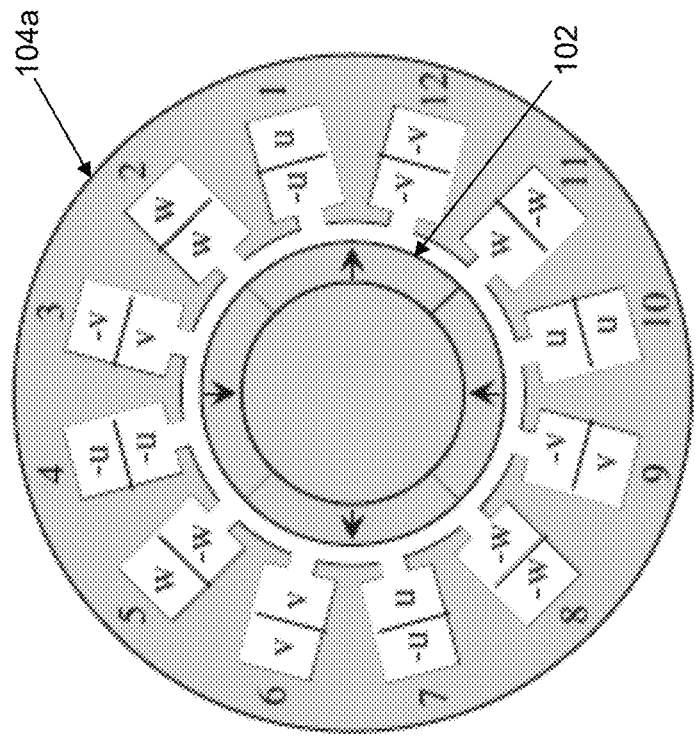
FIG. 5B depicts a top view of the machine of FIG. 1 with windings for a suspension force excitation in accordance with an illustrative embodiment.
Figure 5C:
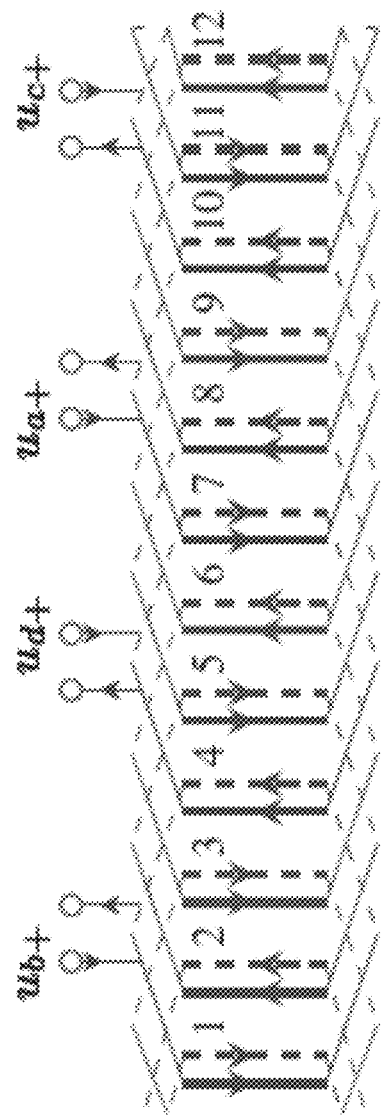
FIG. 5C depicts a winding schematic of the machine of FIGS. 4 and 5 with windings for a suspension force excitation in accordance with an illustrative embodiment.

An example machine with a DPNV winding is shown in FIGS. 5A and 5B. Every inductor symbol in FIG. 4 represents a group of coils, denoted by a subscript a-d for each phase. For this example, each coil group consists of only a single coil, as shown in FIG. 5C for phase u. A coil group can be modeled as shown in FIG. 7A where the voltage source represents a sum of the motional-EMF and coupling with other coil groups. The DPNV winding is designed so that the voltage source magnitude and phase are equivalent for groups a and b and groups c and d. The voltage sources cancel from the suspension coil (connected between suspension terminals) perspective, which results in the no voltage characteristic.

Referring to FIG. 5A, a top view of radial flux machine 100 with windings for a torque excitation is shown in accordance with an illustrative embodiment with radial flux machine 100 implemented as a PM motor. Referring to FIG. 5B, a view of radial flux machine 100 with windings for a suspension force excitation is shown in accordance with an illustrative embodiment. A stator 104a includes 12 slots. For the illustrative embodiment of FIGS. 5A and 5B, Q=12, p=2, $p_s$=1, m=3, where Q is a number of stator slots, p is the number of pole-pairs for the torque coil, $p_s$ is the number of pole-pairs for the suspension coil, and m is a number of winding phases with the three phases designated u, v, w.

Figure 6:
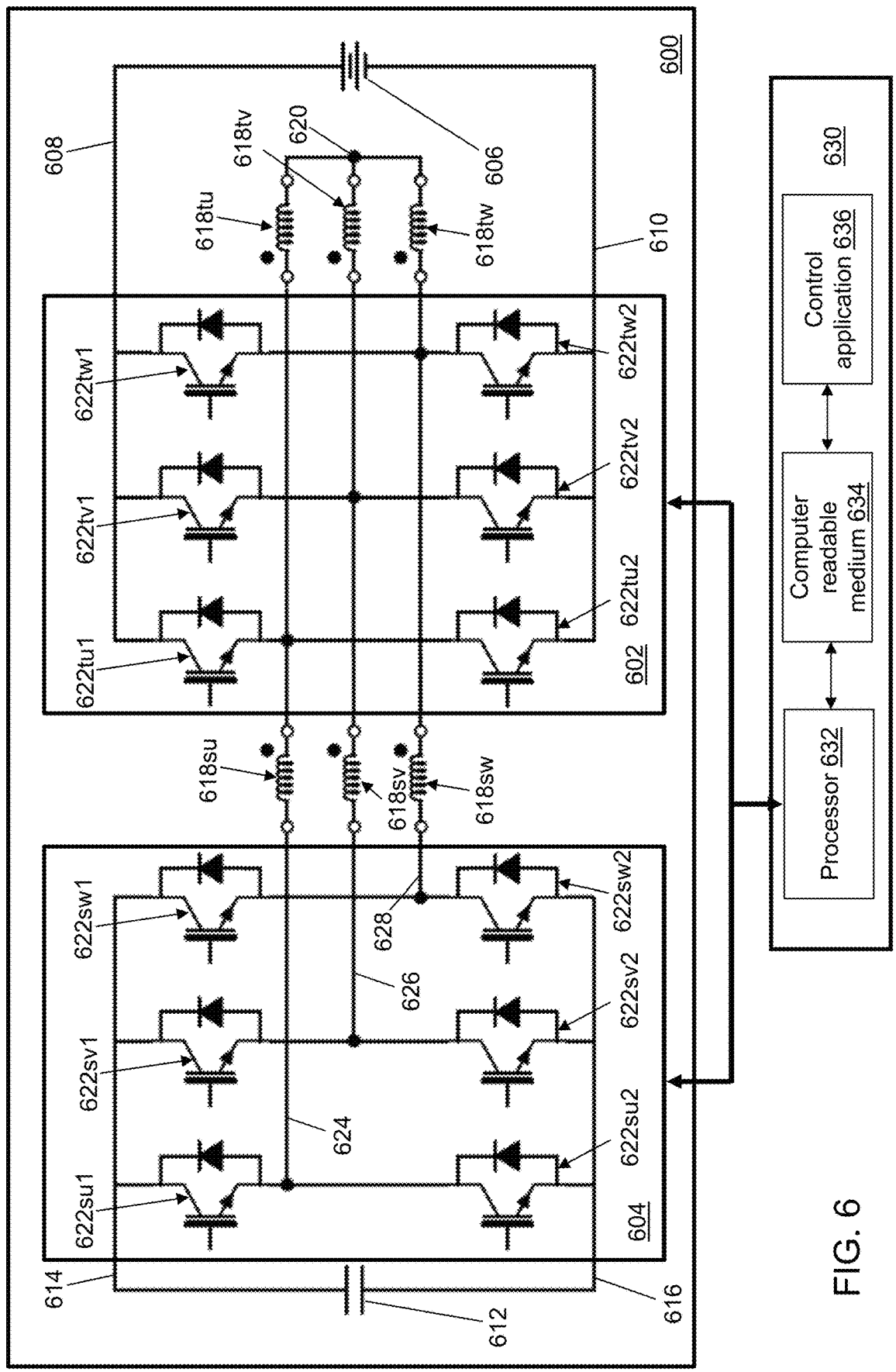
FIG. 6 depicts a circuit diagram of a drive for the machine of FIG. 1 in accordance with an illustrative embodiment.

Referring to FIG. 6, a circuit diagram of a drive 600 for radial flux machine 100 is shown in accordance with an illustrative embodiment. Drive 600 for radial flux machine 100 reduces a number of hardware components to that which is needed in a traditional drive of a separate-winding bearingless motor. Reducing the number of hardware components reduces the cost of radial flux machine 100, while retaining performance gains associated with other combined winding designs. As a result, bearingless motor technology can be extended into new, cost-sensitive application areas where it has the potential to offer extreme performance benefits.

Drive 600 may include torque inverter 602, suspension inverter 604, a voltage source 606, a capacitor 612, and a drive controller 630. Voltage source 606 is a DC voltage source such as a DC battery or the output of a rectifier connected to a power grid. When voltage source 606 is supplying electric power, its positive terminal is denoted as a cathode to which a first wire 608 is connected, and its negative terminal is denoted as an anode to which a second wire 610 is connected. First wire 608 and second wire 610 connect torque inverter 602 to voltage source 606. Third wire 614 and fourth wire 616 connect suspension inverter 604 to capacitor 612. When capacitor 612 is supplying electric power to suspension inverter 604 by discharging, a current flows on third wire 614 toward suspension inverter 604 from capacitor 612, and when capacitor 612 is charging, a current flows on fourth wire 616 from suspension inverter 604 to capacitor 612 under control of drive controller 630. Capacitor 612 acts as a DC link for suspension inverter 604.

Since no path exists for circulating currents between torque inverter 602 and suspension inverter 604, there is no need for an additional current sensor, nor is there a need to restrict a modulation strategy used by drive controller 630 to control an operation of torque inverter 602 and suspension inverter 604. As a result, space vector pulse width modulation (SVPWM) can be used by drive controller 630 to obtain a maximal DC bus voltage utilization. A suspension capacitor voltage on capacitor 612 can be controlled to have any desired value.

A u-phase stator winding includes a u-phase torque coil 618$tu$ and a u-phase suspension coil 618$su$. A v-phase stator winding includes a v-phase torque coil 618$tv$ and a v-phase suspension coil 618$sv$. A w-phase stator winding includes a w-phase torque coil 618$tw$ and a w-phase suspension coil 618$sw$. Though each of u-phase torque coil 618$tu$, u-phase suspension coil 618$su$, v-phase torque coil 618$tv$, v-phase suspension coil 618$sv$, w-phase torque coil 618$tw$, and w-phase suspension coil 618$sw$ is shown as a single coil, each coil may include a plurality of coils. There is a stator winding for each phase output from torque inverter 602 and suspension inverter 604.

Referring to FIG. 7A, a circuit diagram of a coil 618 included in drive 600 is shown in accordance with an illustrative embodiment. Each coil 618 of each stator winding can be modeled by a positive terminal 700, a negative terminal 702, a resistor 704, an inductor 706, and a voltage source 708. Resistor 704, inductor 706, and voltage source 708 are connected in series between positive terminal 700 and negative terminal 702. Voltage source 708 represents a sum of an EMF and coupling with other coils. Referring again to FIG. 6, each of u-phase torque coil 618$tu$, v-phase torque coil 618$tv$, and w-phase torque coil 618$tw$ are connected to neutral connector 620 at a respective negative terminal 702.

Referring again to FIG. 6, torque inverter 602 includes a u-phase top torque switch 622$tu$1, a u-phase bottom torque switch 622$tu$2, a v-phase top torque switch 622$tv$2, a v-phase bottom torque switch 622$tv$1, a w-phase top torque switch 622$tw$1, and a w-phase bottom torque switch 622$tw$2. Suspension inverter 604 includes a u-phase top suspension switch 622$su$1, a u-phase bottom suspension switch 622$su$2, a v-phase top suspension switch 622$sv$2, a v-phase bottom suspension switch 622$sv$1, a w-phase top suspension switch 622$sw$1, and a w-phase bottom suspension switch 622$sw$2.

Figure 7B:
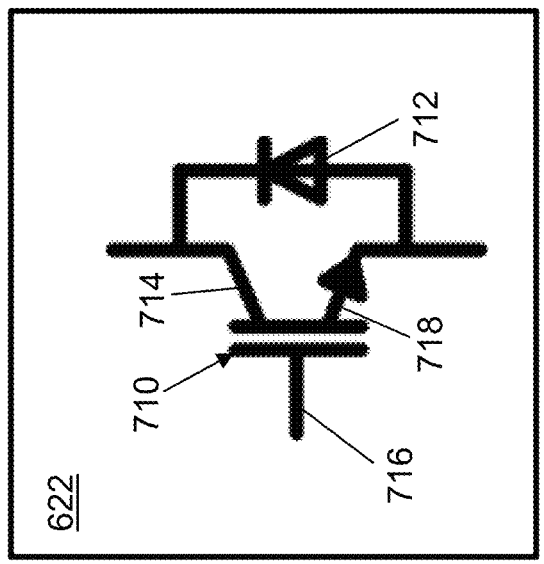
FIG. 7B depicts a circuit diagram of a switch included in the drive of FIG. 6 in accordance with an illustrative embodiment.
Figure 7A:
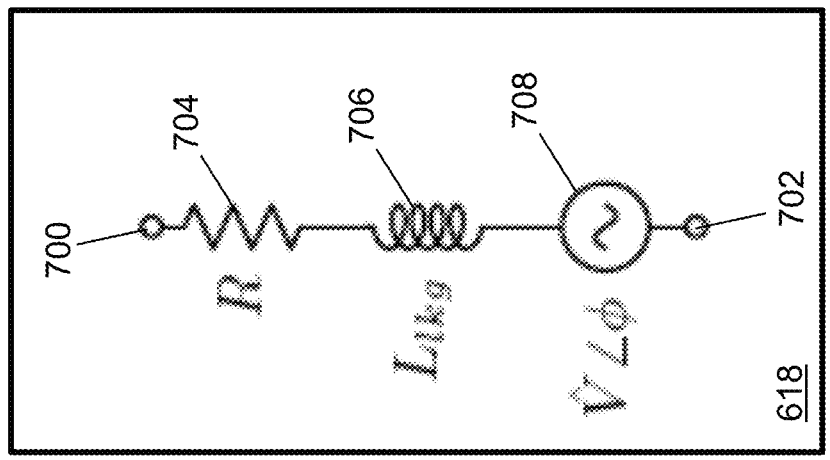
FIG. 7A depicts a circuit diagram of a coil group model included in the drive of FIG. 6 in accordance with an illustrative embodiment.
Figure 7A:
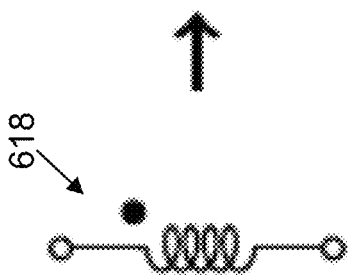

Referring to FIG. 7B, each switch of torque inverter 602 and of suspension inverter 604 may include a transistor 710 and a diode 712 connected anti-parallel across transistor 710. Transistor 710 may include a drain 714, a gate 716, and a source 718 like a metal-oxide-semiconductor field-effect transistor (MOSFET) or include a collector 714, a gate 716, and an emitter 718 like an insulated-gate bipolar transistor (IGBT), or include a collector 714, a base 716, and an emitter 718 like a bipolar junction transistor (BJT). Depending on the switching logic and whether transistor switch 710 is an n-type or a p-type, drain 714 and source 718 may be reversed. A voltage applied to gate 716 determines a switching state of transistor switch 710. Diode 212 is connected between source 718 and drain 714 of transistor 710.

Referring again to FIG. 6, source 718 of u-phase top torque switch 622*tu*1 is connected to drain 714 of u-phase bottom torque switch 622*tu*2. Drain 714 of u-phase top torque switch 622*tu*1 is connected to first wire 608 that may be referred to as a positive bus. Source 718 of u-phase top torque switch 622*tu*1 is connected to second wire 610 that may be referred to as a negative bus. u-phase top torque switch 622*tu*1 and u-phase bottom torque switch 622*tu*2 arranged in this manner form a half-bridge. A half-bridge is included for each phase output from torque inverter 602. Because three-phases are output from torque inverter 602 in the illustrative embodiment, there are three half-bridges and three stator windings. As a result, source 718 of v-phase top torque switch 622*tv*1 is connected to drain 714 of v-phase bottom torque switch 622*tv*2. Drain 714 of v-phase top torque switch 622*tv*1 is connected to first wire 608, and source 718 of v-phase top torque switch 622*tv*1 is connected to second wire 610. Source 718 of w-phase top torque switch 622*tw*1 is connected to drain 714 of w-phase bottom torque switch 622*tw*2. Drain 714 of w-phase top torque switch 622*tw*1 is connected to first wire 608, and source 718 of w-phase top torque switch 622*tw*1 is connected to second wire 610.

Similarly, source 718 of u-phase top suspension switch 622*su*1 is connected to drain 714 of u-phase bottom suspension switch 622*su*2. Drain 714 of u-phase top suspension switch 622*su*1 is connected to third wire 614 that may be referred to as a capacitor positive bus. Source 718 of u-phase top suspension switch 622*su*1 is connected to fourth wire 616 that may be referred to as a capacitor negative bus. Source 718 of v-phase top suspension switch 622*sv*1 is connected to drain 714 of v-phase bottom suspension switch 622*sv*2. Drain 714 of v-phase top suspension switch 622*sv*1 is connected to third wire 614, and source 718 of v-phase top suspension switch 622*sv*1 is connected to fourth wire 616. Source 718 of w-phase top suspension switch 622*sw*1 is connected to drain 714 of w-phase bottom suspension switch 622*sw*2. Drain 714 of w-phase top suspension switch 622*sw*1 is connected to third wire 614, and source 718 of w-phase top suspension switch 622*sw*1 is connected to fourth wire 616.

Gate 716 of each switch 622 is connected to drive controller 630 to receive gating signals to control a state of each top switch and each bottom switch of each phase of torque inverter 602 and of suspension inverter 604. At any point in time, only one of the top switch and the bottom switch of each half-bridge is effectively closed. As stated previously, the gating signals may be determined using SVPWM.

A u-phase line 624 is connected between source 718 of u-phase top suspension switch 622*su*1 and drain 714 of u-phase bottom suspension switch 622*su*2. u-phase line 624 is also connected between source 718 of u-phase top torque switch 622*tu*1 and drain 714 of u-phase bottom torque switch 622*tu*2. u-phase line 624 connects the u-phase half-bridge of suspension inverter 604 to the u-phase half-bridge of torque inverter 602, and to a u-phase stator winding that includes u-phase torque coil 618*tu* and u-phase suspension coil 618*su*. Torque coil 618*tu* is connected to u-phase line 624 between u-phase suspension coil 618*su* and neutral connector 620. Positive terminal 700 of u-phase torque coil 618*tu* is connected adjacent to positive terminal 700 of u-phase suspension coil 618*su*.

A direction of current flow from u-phase line 624 to fourth wire 616 through u-phase bottom suspension switch 622*su*2 indicates the u-phase half-bridge of suspension inverter 604 is discharging capacitor 612, and a direction of current flow from third wire 614 to u-phase line 624 through u-phase top suspension switch 622*su*1 indicates the u-phase half-bridge of suspension inverter 604 is discharging capacitor 612.

Similarly, a v-phase line 626 is connected between source 718 of v-phase top suspension switch 622*sv*1 and drain 714 of v-phase bottom suspension switch 622*sv*2. v-phase line 626 is also connected between source 718 of v-phase top torque switch 622*tv*1 and drain 714 of v-phase bottom torque switch 622*tv*2. v-phase line 626 connects the v-phase half-bridge of suspension inverter 604 to the v-phase half-bridge of torque inverter 602, and to a v-phase stator winding that includes v-phase torque coil 618*tv* and v-phase suspension coil 618*sv*. Torque coil 618*tv* is connected to v-phase line 626 between v-phase suspension coil 618*sv* and neutral connector 620. Positive terminal 700 of v-phase torque coil 618*tv* is connected adjacent to positive terminal 700 of v-phase suspension coil 618*sv*.

A direction of current flow from v-phase line 626 to fourth wire 616 through v-phase bottom suspension switch 622*sv*2 indicates the v-phase half-bridge of suspension inverter 604 is discharging capacitor 612, and a direction of current flow from third wire 614 to v-phase line 624 through v-phase top suspension switch 622*sv*1 indicates the v-phase half-bridge of suspension inverter 604 is discharging capacitor 612.

Similarly, a w-phase line 628 is connected between source 718 of w-phase top suspension switch 622*sw*1 and drain 714 of w-phase bottom suspension switch 622*sw*2. w-phase line 628 is also connected between source 718 of w-phase top torque switch 622*tw*1 and drain 714 of w-phase bottom torque switch 622*tw*2. w-phase line 628 connects the w-phase half-bridge of suspension inverter 604 to the w-phase half-bridge of torque inverter 602, and to a w-phase stator winding that includes w-phase torque coil 618*tw* and w-phase suspension coil 618*sw*. Torque coil 618*tw* is connected to w-phase line 626 between w-phase suspension coil 618*sw* and neutral connector 620. Positive terminal 700 of w-phase torque coil 618*tw* is connected adjacent to positive terminal 700 of w-phase suspension coil 618*sw*.

A direction of current flow from w-phase line 628 to fourth wire 616 through w-phase bottom suspension switch 622*sw*2 indicates the w-phase half-bridge of suspension inverter 604 is discharging capacitor 612, and a direction of current flow from third wire 614 to w-phase line 624 through w-phase top suspension switch 622*sw*1 indicates the w-phase half-bridge of suspension inverter 604 is discharging capacitor 612.

As shown in FIG. 6, each stator winding includes at least two pairs of terminal connections (a pair of terminal connections is positive terminal 700 and negative terminal 702), one for a torque coil and one for a suspension coil. Current flowing from a terminal connection associated with suspension inverter 604 to winding neutral connector 620 creates a one pole pair $p_s=1$ or a $p_s=p\pm1$ pole pair MMF for the creation of suspension forces and current flowing from a terminal connection associated with torque inverter 602 to either winding neutral connector 620 or a terminal associated with suspension inverter 604 creates a p pole pair MMF to rotate top rotor 102 and/or bottom rotor 103. The terminals associated with suspension inverter 604 connect to the same stator winding as those associated with torque inverter 602, but have a direction reversed as discussed previously.

Drive controller 630 may include a non-transitory computer-readable medium 634, a processor 632, and a control application 636. Fewer, different, and/or additional components may be incorporated into drive controller 630.

Computer-readable medium 634 is an electronic holding place or storage for information so the information can be accessed by processor 632 as understood by those skilled in the art. Computer-readable medium 634 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. drive controller 630 may have one or more computer-readable media that use the same or a different memory media technology. For example, computer-readable medium 634 may include different types of computer-readable media that may be organized hierarchically to provide efficient access to the data stored therein as understood by a person of skill in the art.

Processor 632 executes instructions as understood by those skilled in the art. The instructions may be carried out by a special purpose computer, logic circuits, or hardware circuits. Processor 632 may be implemented in hardware and/or firmware. Processor 632 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 632 operably couples with computer-readable medium 634 to receive, to send, and to process information. Processor 632 may retrieve a set of instructions from a permanent memory device and copy the instructions in an executable form to a temporary memory device that is generally some form of RAM. Drive controller 630 may include a plurality of processors that use the same or a different processing technology.

Control application 636 performs operations associated with receiving sensor signals such as current sensor data and computing the gate signals input to torque inverter 602 and to suspension inverter 604. The operations may be implemented using hardware, firmware, software, or any combination of these methods. For illustration, drive 600 includes four current sensors, a single isolated voltage bus, and twelve switches to support the three-phases.

Referring to the example embodiment of FIG. 6, control application 636 is implemented in software (comprised of computer-readable and/or computer-executable instructions) stored in computer-readable medium 634 and accessible by processor 632 for execution of the instructions that embody the operations of control application 636. Control application 636 may be written using one or more programming languages, assembly languages, scripting languages, etc. Control application 636 may be integrated with other analytic tools.

Referring to FIGS. 8A-8D, design steps for determining a winding arrangement for radial flux machine 100 are shown in accordance with an illustrative embodiment. A winding design approach as described in E. L. Severson, R. Nilssen, T. Undeland, and N. Mohan, *Design of dual purpose no-voltage combined windings for bearingless motors*, IEEE Transactions on Industry Applications, vol. 53, no. 5, pp. 4368-4379, September 2017 (Severson) is shown for illustration. The described winding design technique creates a single stator winding for each phase that produces both suspension (radial) force and torque. As discussed previously, each stator winding has at least two pairs of terminal connections: 1) a torque coil(s) connected using torque terminals, and 2) a suspension coil(s) connected using suspension terminals. The suspension terminals experience no motional-EMF when, for example, top rotor 102 and/or bottom rotor 103 are centered, which means that suspension inverter 604 can have a low voltage rating and that rotor vibrations can be passively damped by short-circuiting the suspension terminals. A usable fraction of the suspension DC bus and of the torque DC bus is $1/\sqrt{3}$. A current rating of suspension inverter 604 is a current rating of u-phase suspension coil 618$su$, of v-phase suspension coil 618$sv$, and of w-phase suspension coil 618$sw$. A voltage rating of suspension inverter 604 is less than or equal to that of torque inverter 602.

To design the winding arrangement as described in Severson, an acceptable combination of Q, p, $p_s$, m is selected. For illustration FIGS. 8A-8D show Q=18, p=5, $p_s$=4, m=3. A coil pitch is determined using $$k_{p,h} = \sinh\frac{\alpha_y}{2},$$

where h is a harmonic index or electric frequency and $\alpha_y$ is a pitch of each coil, where y is a coil span defined as a number of slots. The torque coil layout is determined. An illustration of a torque phasor star representing a torque coil layout is shown in FIG. 8A. Which suspension coils to reverse is determined. An illustration of a torque phase u connection star with h=$p_s$ representing the determined suspension coils to reverse is shown in FIG. 8B. The torque coil and suspension coil are assigned to a coil group as illustrated in FIG. 8C. A resulting winding layout is shown in FIG. 8D for illustration with the terminal connections shown for phase u.

Figure 9:
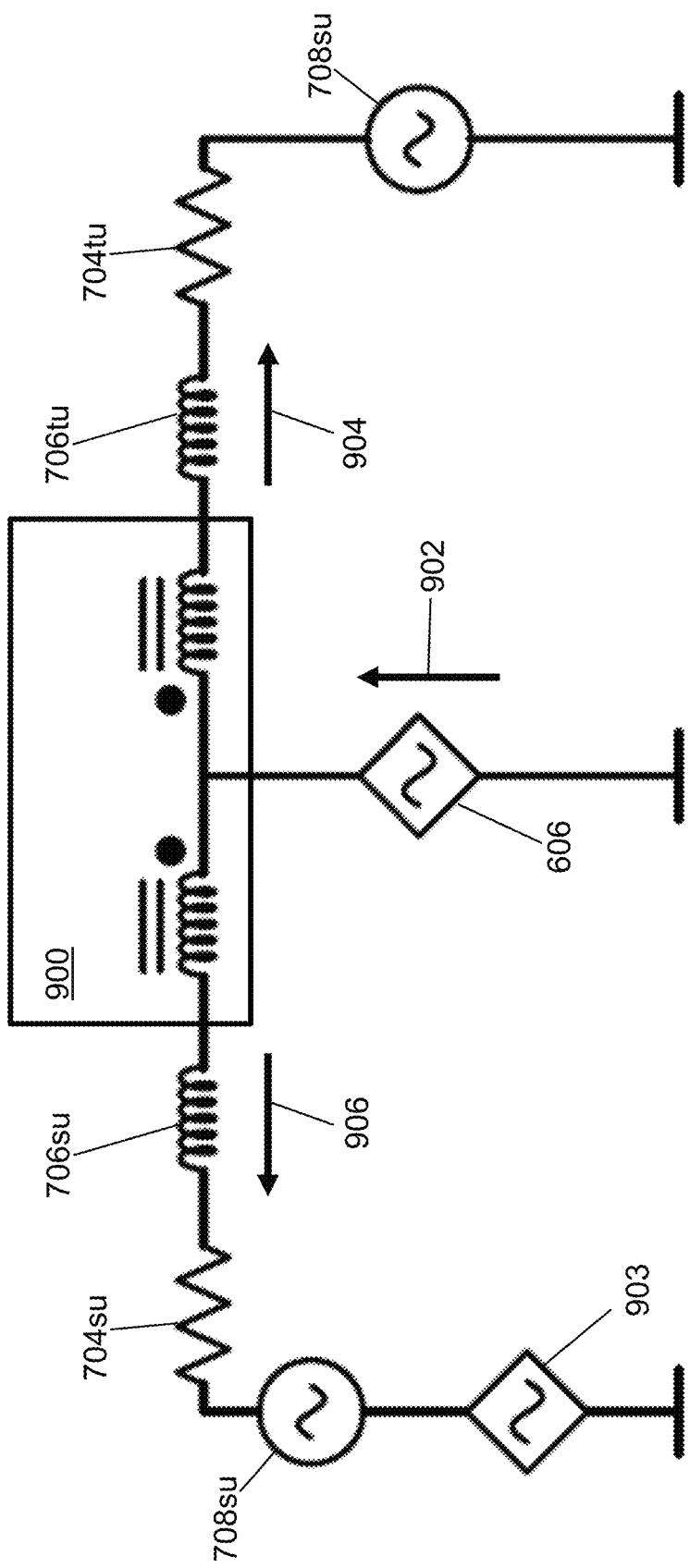
FIG. 9 depicts an equivalent single-phase circuit for the drive of FIG. 6 in accordance with an illustrative embodiment.

Referring to FIG. 9, an equivalent single-phase circuit for drive 600 is shown in accordance with an illustrative embodiment. In this circuit, torque inverter 602 is represented as a dependent voltage source $\vec{v}_t$ 606, with an output current 902 of $\vec{1}_t$, and suspension inverter 604 as a voltage $\vec{v}_s$ 903 from capacitor 612, with an output current 906 $-\vec{1}_\alpha$. The electric circuit of u-phase suspension coil 618$su$ and of u-phase torque coil 618$tu$ includes resistor 704 having a resistive value represented by R, inductor 706 having an inductive value represented by L, and voltage source 708 having a back-EMF value represented by $\vec{e}$. Inductor 706 is a self-inductance and back-EMF $\vec{e}$ combined with a mutual inductance 900 M linking the two coils. The dotted inductors represent a polarity of mutual inductance 900 M, that corresponds to the dotted terminals of FIG. 6. A current 906 $\vec{1}_a$ and a current 908 $\vec{1}_b$ are also indicated.

Figure 10:
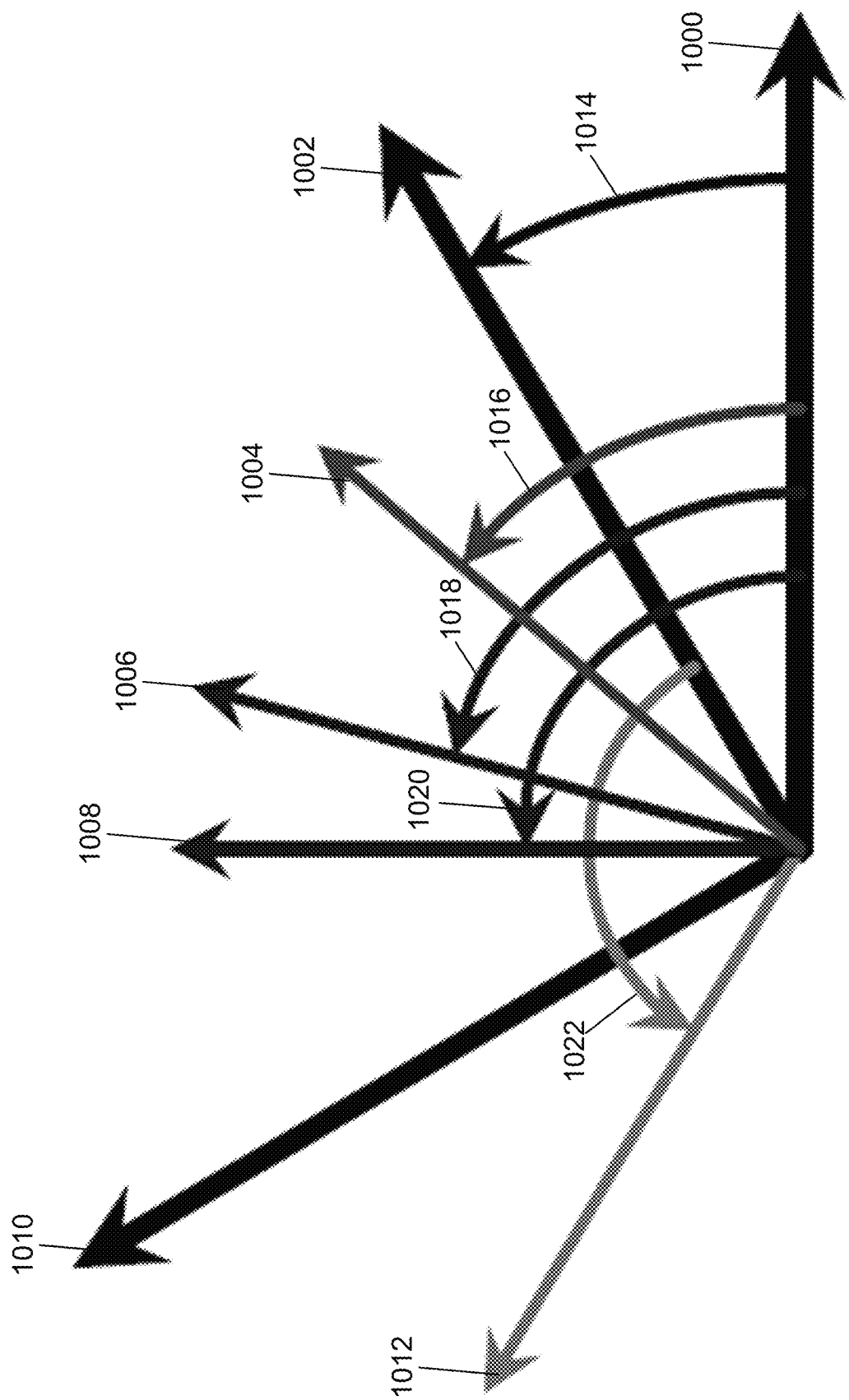
FIG. 10 depicts a space vector and machine axes for a system model of drive 600 in accordance with an illustrative embodiment.

Referring to FIG. 10, shows a space vector and machine axes for a system model of drive 600 in accordance with an illustrative embodiment. A first vector 1000 is a u-phase axis. A second vector 1002 is a rotor direct axis. A third vector 1004 is a force $\vec{F}$ axis. A fourth vector 1006 is an $\vec{1}_s$ axis. A fifth vector 1008 is an $\vec{v}_s$ axis. A sixth vector 1010 is a rotor quadrature axis. A seventh vector 1012 is an $\vec{1}_t$ axis. A first angle 1014 is $\theta_{du}$ an angle of second vector 1002. A second angle 1016 is $\phi_F$ an angle of third vector 1004. A third angle 1018 is $\phi_{si}$ an angle of fourth vector 1006 where $\phi_{si} = \phi_F - \phi_k$. A fourth angle 1020 is $\phi_{si}$ an angle of fifth vector 1008. A fifth angle 1022 is $\phi_t$ an angle of seventh vector 1012 measured from second vector 1002.

Torque current $\vec{1}_t$ of torque inverter 602 is the traditional motor current space vector, which can be decomposed into direct $i_d$ and quadrature $i_q$ components. A non-salient rotor structure is assumed so that torque is determined by $T=k_t i_q$. Controlled radial suspension forces are produced by superimposing a suspension current $\vec{i}_s$ of suspension inverter 604 onto torque current $\vec{i}_t$, for example, in u-phase suspension coil 618su and u-phase torque coil 618tu. This is done by using current regulators to control $\vec{i}_t$ and $\vec{i}_a$ to achieve the following currents:

$$\vec{i}_a = \frac{1}{2}\vec{i}_t - \vec{i}_s \qquad (1)$$
$$\vec{i}_b = \frac{1}{2}\vec{i}_t + \vec{i}_s$$

The suspension current $\vec{i}_s$ is related to the force vector that is produced on shaft 200, where $\bar{k}_i = k_i \angle \phi_k$ contains information on both the magnitude and angular difference between $\vec{i}_s$ and $\vec{F}$. The value of $\phi_k$ is specified in equation (3) based on the number of pole pairs, for example, of u-phase torque coil 618tu, where $\theta_{du}$ is the angle of the rotor's direct axis and $\phi_0$ is a constant offset between u-phase suspension coil 618su and u-phase torque coil 618tu, which can be assumed to be $\phi_0=0$. The sign of $\theta_{du}$ depends on whether a suspension phase sequence is transposed with respect to a motor phase sequence or not. A sign in equation (3) is indicated for a non-transposed case.

$$\vec{i}_s = \frac{1}{k_i}\vec{F} \qquad (2)$$

$$\phi_k = \begin{cases} -\theta_{du} + \phi_0, & \text{if } p_s = p \pm 1 \\ \phi_0, & \text{if } p_s = 1 \text{ and } p \geq 4 \end{cases} \qquad (3)$$

A suspension inverter voltage of suspension inverter 604 can be calculated using equation (4), where the motor's back-EMF $\vec{e}$ cancels out thereby satisfying a "no voltage" property of DPNV stator windings. When the coil group currents are given by (1), $\vec{v}_s$ simplifies to (5), which corresponds to the steady state impedance of (6). This reveals that the suspension voltage is determined by the suspension current $\vec{i}_s$ (or, equivalently, $\vec{F}$), independent of $\vec{i}_t$.

$$\vec{v}_s = \vec{e} + R\vec{i}_b + L\frac{d\vec{i}_b}{dt} + M\frac{d\vec{i}_a}{dt} - \left(\vec{e} + R\vec{i}_a + L\frac{d\vec{i}_a}{dt} + M\frac{d\vec{i}_b}{dt}\right) \qquad (4)$$

$$= 2(L-M)\frac{d\vec{i}_s}{dt} + 2R\frac{d\vec{i}_s}{dt} \qquad (5)$$

$$\bar{z} = \frac{\vec{v}_s}{\vec{i}_s} = 2R + j\omega_s 2(L-M) \qquad (6)$$

Suspension inverter 604 supplies current to maintain a levitation of shaft 200, which requires real power to flow from suspension inverter 604 and into the suspension coil winding resistance, which will discharge capacitor 612. To maintain a capacitor voltage on capacitor 612, power is transferred from torque inverter 602 to suspension inverter 604. A steady state power into capacitor 612 can be calculated using equation (7), where $\phi_z$ is an angle of $\bar{z}$.

$$P = \text{Real}\{\vec{v}_s \vec{i}_a^*\} = P_{TS} - P_{SS} \qquad (7)$$
$$= \frac{1}{2}v_s i_t \cos(\phi_s - \phi_t - \theta_{du}) - \frac{v_s^2}{z}\cos\phi_z$$

$$P_{TS} = \frac{1}{2}v_s i_d \cos(\phi_s - \theta_{du}) + \frac{1}{2}v_s i_q \sin(\phi_s - \theta_{du}) \qquad (8)$$

$$\vec{v}_s = \frac{\bar{z}}{k_i}\vec{F} \qquad (9)$$

A first term of equation (7) represents a first power $P_{TS}$ flowing from torque inverter 602 to suspension inverter 604, which can be expressed in terms of $i_d$ and $i_q$ as shown in equation (8). A second term of equation (7) represents a second power $P_{SS}$ flowing from suspension inverter 604 into the coil resistances. For a horizontal shaft machine, $\vec{v}_s$ and $\vec{i}_s$ have the steady state values required to generate a constant force to support a weight of shaft 200. The steady state suspension voltage vector can be calculated using equation (9) by solving equations (2) and (6). The necessary torque current $\vec{i}_t$ to maintain the voltage on capacitor 612 can be found by solving equation (7) for P=0. While there appear to be two degrees of freedom in this expression ($i_d$ and $i_q$), this ambiguity is resolved by noting that the q-axis current $i_q$ is specified by a torque requirement T of radial flux machine 100 ($i_q=T/k_t$).

In systems where a constant force is present (for example, gravitational force on a horizontal shaft machine), an additional current can be provided by torque inverter 602 to interact with the steady state suspension voltage space vector to charge capacitor 612. In systems where a constant force is not present, a steady state suspension voltage space vector is also added potentially creating a problematic suspension force ripple. Three approaches to transferring power to suspension inverter 604 are discussed below. Applicability of each approach for a given bearingless radial flux machine 100 is determined based on whether a constant shaft force is present and the angle of $\phi_k$.

Figure 11:
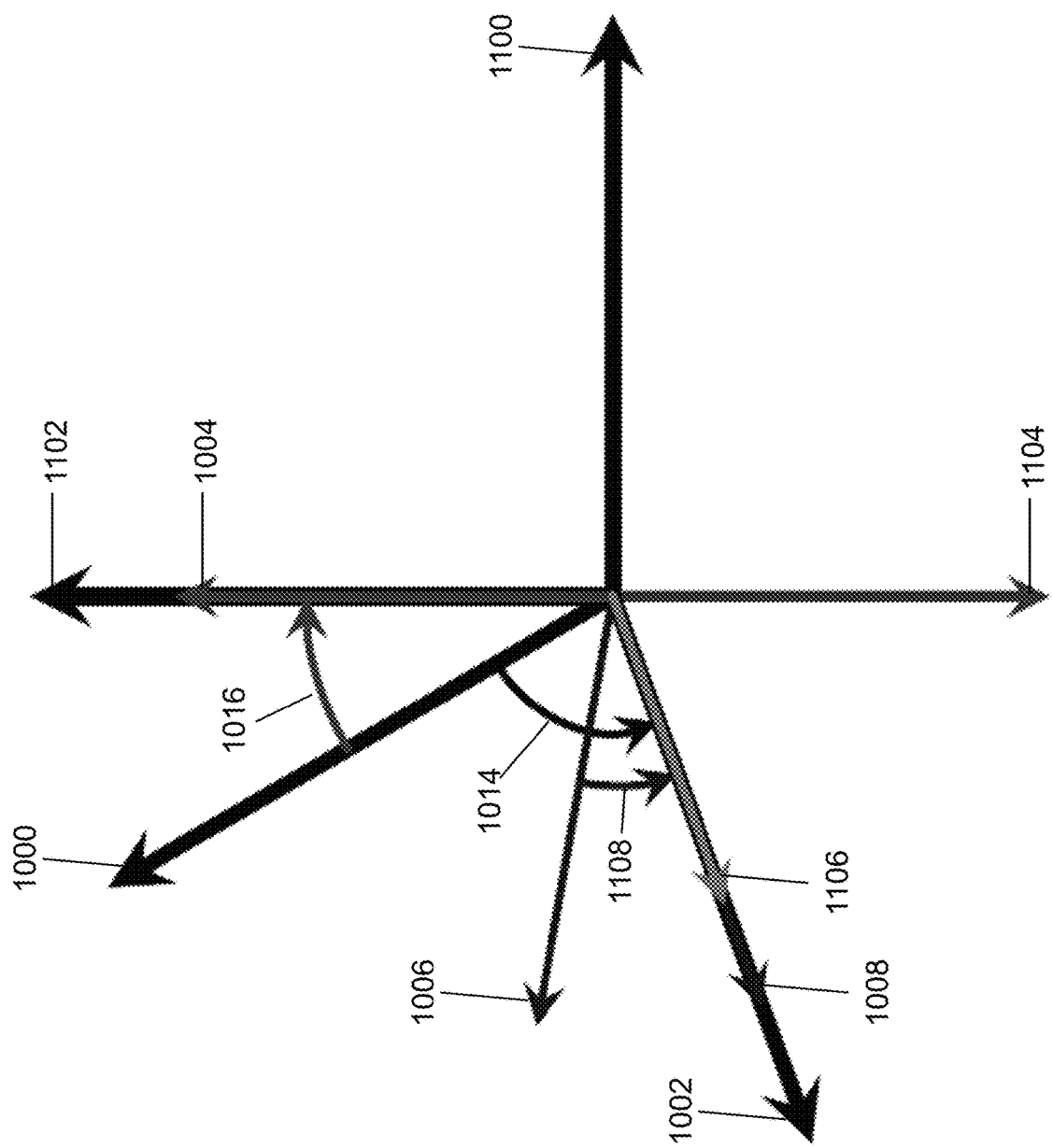
FIG. 11 depicts a first space vector power flow for the drive of FIG. 6 based on a first machine configuration in accordance with an illustrative embodiment.

Referring to FIG. 11, a first space vector power flow for drive 600 based on a first machine configuration is shown in accordance with an illustrative embodiment. A constant radial force $\vec{F}$ (third vector 1004) is present and $\phi_k=-\theta_{du}$ (first angle 1014), which corresponds to $p_s=p\pm1$ pole pairs of the suspension coils of each phase. Using this value for $\phi_k$, equation (9) can be solved for $\phi_s=\phi_F+\theta_{du}+\phi_z$, where $\phi_F$ is indicated by second angle 1016 and $\phi_z$ is indicated by sixth angle 1108, which simplifies equations (7) to (10). This indicates a constant power $P_{TS}$ in steady state conditions where the magnitude of $\vec{v}_s$ (fifth vector 1008) is given by equation (11) for a shaft of mass m. Note that power flow between torque inverter 602 and suspension inverter 604 depends on torque generated by radial flux machine 100 since $i_q=T/k_t$. This is highly undesirable, as it will require an additional current $i_d$ to compensate for changes in load torque.

$$P_{TS} = \frac{1}{2}v_s i_d \cos(\phi_F + \phi_Z) + \frac{1}{2}v_s i_q \sin(\phi_F + \phi_Z) \qquad (10)$$

$$v_s = \frac{z}{k_i}mg \qquad (11)$$

To eliminate the dependence on the machine's load, radial flux machine 100 having constant radial force $\vec{F}$ and $\phi_k = -\theta_{du}$ can be oriented to set the force vector angle as second angle 1016 $\phi_F = -\phi_z$, in which case equation (10) reduces to equation (12). This can be accomplished by orienting a stator housing at a proper angle with respect to a horizon indicated by a horizontal axis 1100. A vertical axis 1102 and a gravity force vector $\vec{G}$ 1104 are also shown, where $\vec{G}$=mg, where is a speed of gravity. A d-axis current $i_d$ 110 is calculated from equation (13) by equating equation (12) to $P_{SS}$. Since $i_d$ is split evenly between the suspension coil and the torque coil of each phase, the amount of coil group current allocated to the suspension coil becomes $$i_s \leq i_s + \frac{i_d}{2} \leq 2i_s,$$

where $i_s$ is indicated by fourth vector 1006. In a typical design, the suspension coil current is required to support the weight of shaft 200 that is nearly two orders of magnitude smaller than a rated q-axis current. As a result, this additional current requirement doesn't have any meaningful impact on a performance of radial flux machine 100 in the first configuration.

$$P_{TS} = \frac{1}{2} v_s i_d \quad (12)$$

$$i_d = \frac{2v_s}{z} \cos\phi_z = 2i_s \cos\phi_z \quad (13)$$

In practice, maintaining $\phi_F = -\phi_z$ may prove to be a problematic solution for a few reasons. First, it may not be practical for system integrators to guarantee the motor's orientation at install time satisfies $\phi_F = -\phi_z$. Second, it prevents the use of field weakening techniques since $i_d$ is used to regulate the power flow to floating capacitor. Third, $\phi_z$ is the angle of equation (6) that depends on a rotational frequency of the rotor of radial flux machine 100 ($\omega_x = d\phi_k/dt = d\theta_{du}/dt$). If the machine's speed varies significantly during operation, the motor orientation chosen at install time will not continue to satisfy $\phi_F = -\phi_z$ for all operating conditions, meaning that the actual power flow will depend on $i_q$ as specified in equation (10). This analysis of power flow applies to standard parallel drive implementations, which means that horizontal shaft parallel winding motors in general are prone to a potentially problematic power flow between suspension inverter 604 and torque inverter 602.

Figure 12:
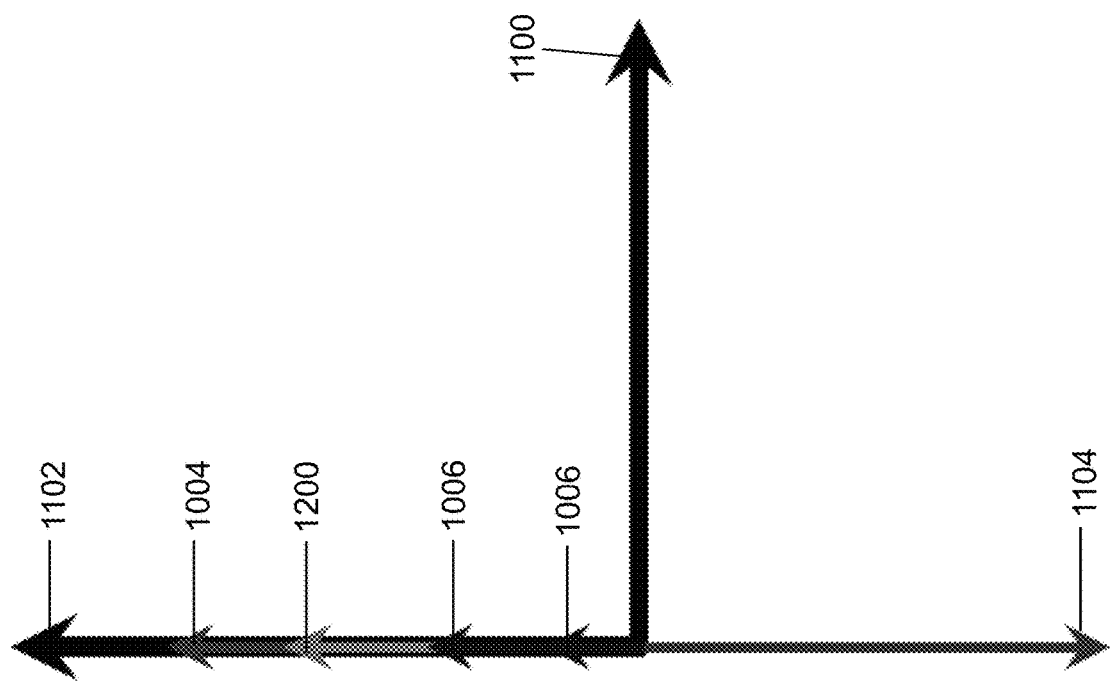
FIG. 12 depicts a second space vector power flow for the drive of FIG. 6 based on a second machine configuration in accordance with an illustrative embodiment.

Referring to FIG. 12, a second space vector power flow for drive 600 based on a second machine configuration is shown in accordance with an illustrative embodiment. Constant radial force is present and $\phi_k = 0$, which corresponds to $p_s = 1$ pole pair of the suspension coils of each phase. For the case of a constant direction force, $\vec{v}_s$ is stationary and equation (6) reduces to $\overline{z}=3R$ (since $\omega_s=0$), which means that $\phi_s = \phi_F$. Using this angle in equation (8) reveals that constant values of $i_d$ and $i_q$ produce no average power flow to suspension inverter 604. To overcome this, the torque current space vector is modified by adding an additional stationary vector $\vec{1}_0$ 1200 aligned with $\vec{v}_s$ as shown in equation (14). Using this new space vector, the average value of $P_{TS}$ is calculated in equation (15) by neglecting terms that don't contribute to the average power. A space vector diagram of this power flow approach is shown in FIG. 12.

$$\vec{i}'_t = \vec{i}_t + i_0 L \phi_F \quad (14)$$

$$\langle P_{TS} \rangle = \frac{1}{2} v_s i_0 \quad (15)$$

$$i_0 = \frac{v_s}{R} = 2i_s \quad (16)$$

$$i'_d = i_0 \cos(\phi_F - \theta_{du}) + i_d \quad (17)$$

$$i'_q = i_0 \sin(\phi_F - \theta_{du}) + i_q \quad (18)$$

The required magnitude of $\vec{1}_0$ is calculated in equation (16), which indicates that the fraction of the suspension coil current allocated for suspension forces is doubled using this control technique. Since $\vec{1}_0$ is stationary, it appears in both the direct and quadrature components of $\vec{1}'_t$ as seen in equations (17) and (18). This will produce torque ripple. However, as previously mentioned, in a well-designed bearingless motor, the required value of $i_s$ to support the shaft's weight is nearly two orders of magnitude smaller than the rated torque current meaning that $i_0$ will not have a significant impact on the motor's performance. There is no restriction on the orientation of the rotor.

One potential area of concern for this type of power flow control is the performance at low or zero rotational speeds. For example, if a stationary holding torque is produced by the stator, $\theta_{du}$ will have a constant value and the actual power transferred will be the sum of equations (7) and (8). This may cause a problematic power flow from torque inverter 602 to suspension inverter 604 that is dependent upon the motor torque, similar to the problem described at variable speed for the control approach described by FIG. 11. This is not viewed as a problem for high speed motor designs that do not require static holding torques and pass quickly through the low speed operating region.

Figure 13:
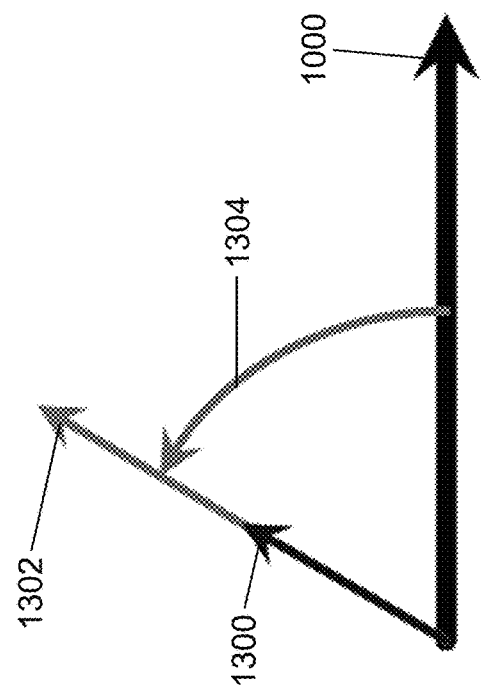
FIG. 13 depicts a third space vector power flow for the drive of FIG. 6 based on a third machine configuration in accordance with an illustrative embodiment.

Referring to FIG. 13, a third space vector power flow for drive 600 based on a third machine configuration is shown in accordance with an illustrative embodiment. With or without a constant radial force and with any value of $\phi_k$, power can be transferred to capacitor 612 by adding new rotating components to both $\vec{1}_t$ ($i_f$ indicated by an eighth vector 1302) and $\vec{v}_s$ ($v_f$ indicated by a ninth vector 1300) at a different frequency $\omega_f t$ indicated by a seventh angle 1304 as shown by equation (19). These new rotating components modify the average power transfer equations to become equations (20) and (21).

$$\vec{i}'_t = \vec{i}_t + i_f L \omega_f t \quad (19)$$

$$\vec{v}'_s = \vec{v}_s + v_f L \omega_f t$$

$$z_f = 2R + j\omega_f 2(L - M)$$

$$\langle P_{TS} \rangle = \frac{1}{2} v_f i_f \quad (20)$$

$$\langle P_{SS} \rangle = \frac{v_s^2}{2} \cos\phi_z + \frac{2v_f^2 R}{4R^2 + 4\omega_f^2 (L-M)^2} \quad (21)$$

$$\Delta F = \frac{k_i}{z_f} v_f = \frac{k_i}{\sqrt{4R^2 + 4\omega_f^2 (L-M)^2}} v_f \quad (22)$$

The second term of $\langle P_{SS} \rangle$ corresponds to the additional power drawn from capacitor 612 due to the new frequency component of $\vec{v}'_s$. These added rotating components will also add torque and force ripple equation (22). The effect of this ripple and the amount of loss can be minimized by proper selection of the frequency for the power transfer and a magnitude of the $v_f$. Higher values of $\omega_f$ lead to lower losses and force and torque ripple (and less momentum change since the ripple is applied over a shorter time duration). However, increasing the frequency also increases the voltage needed by torque inverter 602 to realize $i_f$. One option to increase the frequency of the torque and force ripple without increasing the value of $\omega_f$ is to have $i_f$ and $v_f$ rotate backward relative to the rotor's direct axis (second vector 1002).

Trade-offs between each of the power flow approaches described relative to FIGS. 11 to 13 are outlined in Table I below.

TABLE I

| Configuration | First | Second | Third |
|---|---|---|---|
| Req. constant force | Yes | Yes | No |
| Req. $\phi_k =$ | $-\theta_{du}$ | 0 | Any value |
| Adds torque ripple | No | Yes | Yes |
| Adds sus. ripple | No | No | Yes |
| Potential challenges | Required alignment changes with speed | Voltage regulation for low speed operation | Additional losses, ripple, and voltage requirement |

The first and second machine configurations offer the potential for the lowest losses but impose restrictions that may make them infeasible depending on the design application. The third machine configuration offers the most design flexibility but has additional losses and force and torque ripple. The first and second machine configurations require regulating current at two different frequencies. There are well-known approaches to doing this, including resonant controllers and additional integrators in reference frames that rotate at each of the frequency components.

Figure 14:
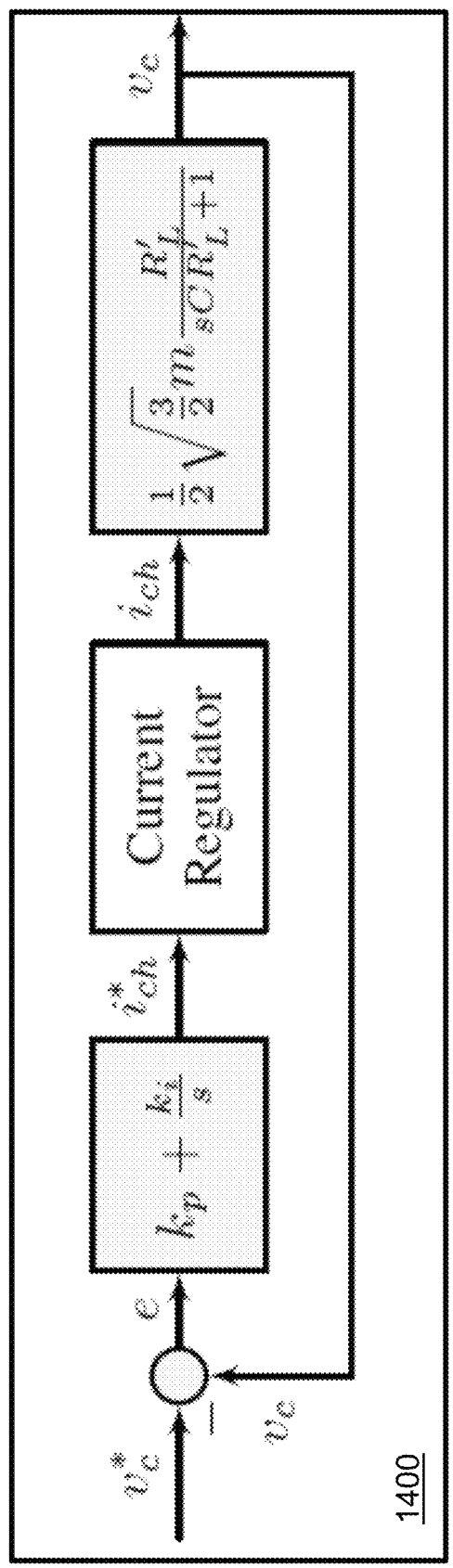
FIG. 14 depicts a block diagram of a control system model for the drive of FIG. 6 to track a reference floating capacitor voltage in accordance with an illustrative embodiment.

Referring to FIG. 14, a block diagram of a control system model 1400 for drive 600 to track voltage $v_c$ on capacitor 612 is shown in accordance with an illustrative embodiment. Control system model 1400 provides a simple control strategy for regulating voltage $v_c$ on capacitor 612 that can be applied to any of the three power flow approaches described relative to FIGS. 11 to 13. The power into capacitor 612 is expressed in equation (23), where from FIG. 6, $v_c$ is the capacitor voltage, $$m = \sqrt{\frac{2}{3}} \frac{v_s}{v_c}$$

is a modulation index for the power invariant space vectors used, $i_{ch}$ is a charging current component from torque inverter 602 ($i_{ch}=i_d$ for the first configuration, $i_{ch}=i_0$ for the second configuration, and $i_{ch}=i_f$ for the third configuration), and $R'_L$ is an equivalent load resistance defined in equation (24) for a constant force F. The third power flow approach has an additional term in $P_{SS}$ which is neglected in the following derivation but can easily be added.

$$v_c C \frac{dv_c}{dt} = P_{TS} - P_{SS} \quad (23)$$

$$= \frac{1}{2} v_s i_{ch} - \frac{v_s^2}{2} \cos\phi_z$$

$$= \frac{1}{2} \sqrt{\frac{3}{2}} m v_c i_{ch} - \frac{v_c}{R'_L}$$

$$R'_L = \frac{v_c}{\sqrt{\frac{3}{2}} m i_s \cos\phi_z} = \frac{v_c^2 k_i^2}{2F^2 R} \quad (24)$$

Next, the differential equation is re-written as a transfer function in equation (25). In these expressions, m, $i_s$, and $\phi_z$ are taken as the values at a nominal operating point (i.e., based on an expected constant force).

$$sCV_c(s) = \frac{1}{2}\sqrt{\frac{3}{2}} m I_{ch}(s) - \frac{1}{R'_L} V_c(s) \quad (25)$$

$$\frac{V_c(s)}{I_{ch}(s)} = \frac{1}{2}\sqrt{\frac{3}{2}} m \frac{R'_L}{sCR'_L + 1}$$

A PI controller can be used to track a reference voltage of capacitor 612. A schematic of the control diagram is shown in FIG. 14. If $k_p$ and $k_i$ are selected as defined in equations (26) and (27), the resulting closed loop transfer function is a first order low pass filter with a bandwidth of $\omega_c$.

$$k_p = \frac{2\omega_c C}{\sqrt{3/2}\, m} \quad (26)$$

$$k_i = \frac{2\omega_c}{\sqrt{3/2}\, mR'_L} \quad (27)$$

MATLAB Simulink was used to simulate each of the three power flow approaches with the voltage regulation controller designed based on control system model 1400. In all simulations, suspension inverter 604 and torque inverter 602 use SVPWM with a 20 kHz switching frequency and their currents are controlled via closed loop regulators. The reference current values are set based on a specified torque ($i_q=T/k_t$), specified radial forces, and the charging current reference $i^*_{ch}$ generated by capacitor 612 voltage regulator shown in FIG. 14. The motor is modeled as having L=5.6 millihenries (mH), M=4.9 mH, R=0.2 Ohms (Ω), and $k_t$=23 Newtons per ampere (N/amp). The angle of $k_t$ is as described in equation (3), based on whether a $p_s$=1 type bearingless motor or a $p_s$=p±1 type bearingless motor is used for radial flux machine 100. The simulation results were normalized by the motors' rated conditions for comparison purposes and the motors are considered as horizontal shaft machines that experience the effects of gravity as a constant radial force. For the simulations of using the first power flow configuration, the stator housing orientation was chosen at install time to satisfy $\phi_F=-\phi_z$ to avoid power being transmitted from torque producing current $i_q$.

Two scenarios were simulated: constant speed and constant torque/force. Results from the constant speed simulations are shown in FIGS. 15A to 15D where the rotor speed is held constant but the torque and suspension current references change according to the values depicted in FIG.

Figure 15A:
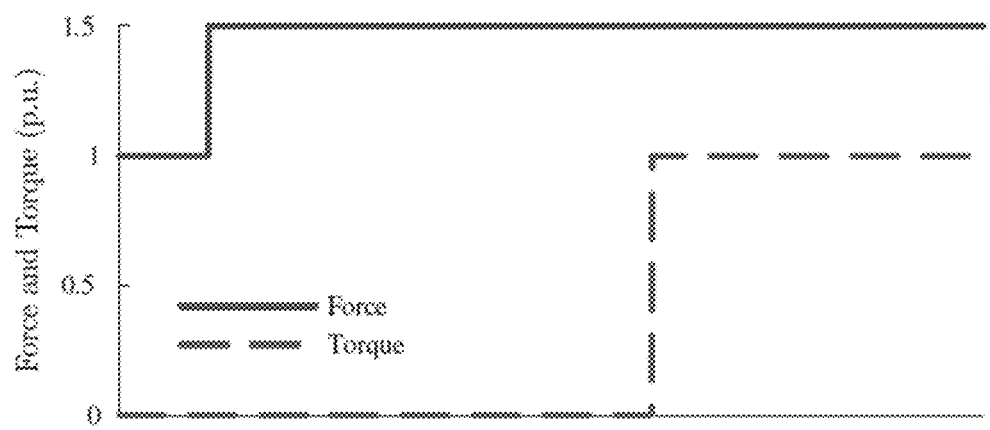
FIG. 15A depicts a reference suspension force and torque as a function of time with a constant rotor speed in accordance with an illustrative embodiment.
Figure 15B:
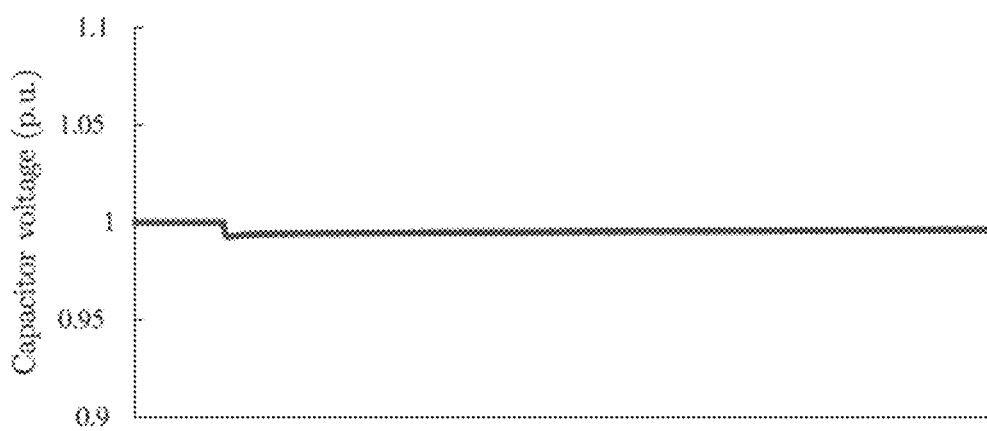
FIGS. 15B-15D depict a floating capacitor voltage as a function of time for the first machine configuration, the second machine configuration, and the third machine configuration, respectively, with the constant rotor speed and the suspension force and torque depicted in FIG. 15A in accordance with an illustrative embodiment.
Figure 15C:
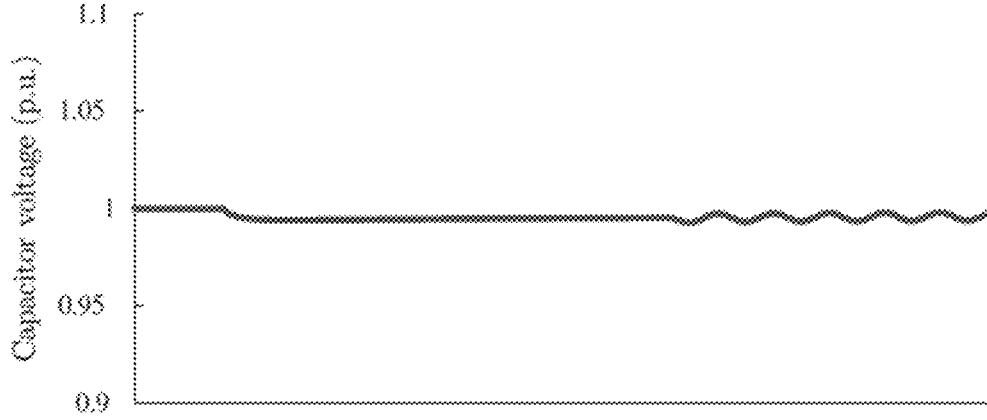
Figure 15D:
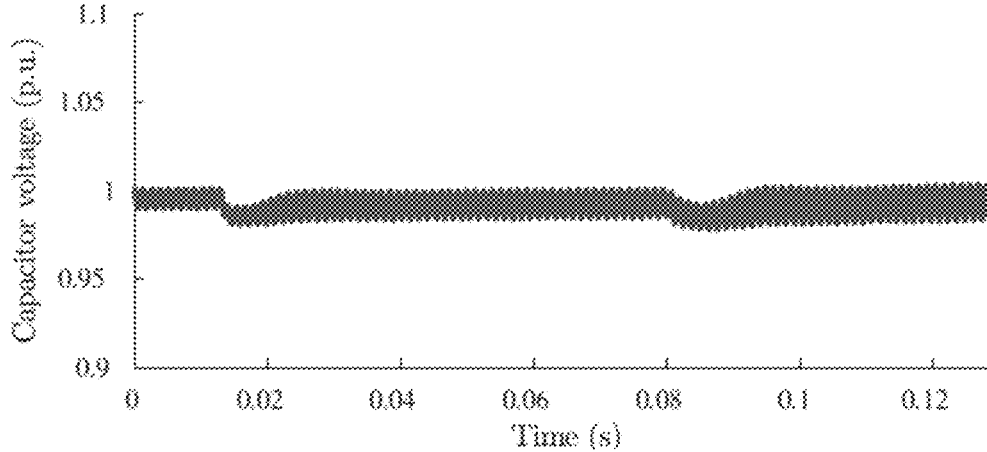

15A. FIG. 15B shows the results using the first power flow configuration. FIG. 15C shows the results using the second power flow configuration. FIG. 15D shows the results using the third power flow configuration. A suspension force of 1 pu corresponds to the gravitational force from shaft 200. Since the machine is at constant speed, the first power flow configuration exhibited the best voltage regulation because no additional frequency current components needed to be injected into radial flux machine 100.

Figure 16A:
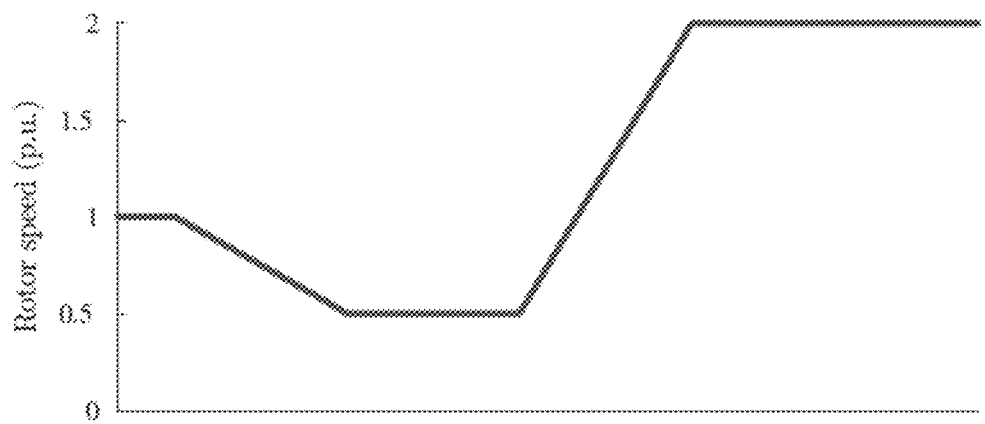
FIG. 16A depicts a rotor speed as a function of time with a constant suspension force and torque in accordance with an illustrative embodiment.
Figure 16B:
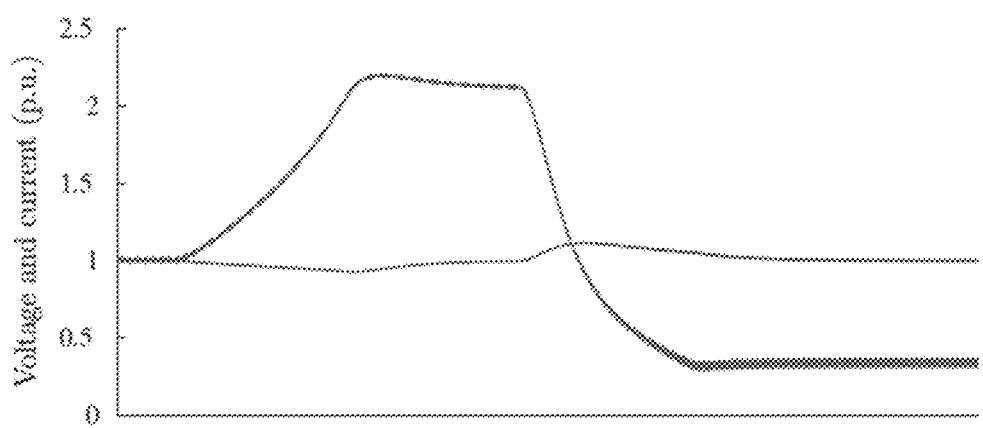
FIGS. 16B-16D depict a floating capacitor voltage and a charge current as a function of time for the first machine configuration, the second machine configuration, and the third machine configuration, respectively, with the constant suspension force and torque and rotor speed depicted in FIG. 16A in accordance with an illustrative embodiment.
Figure 16C:
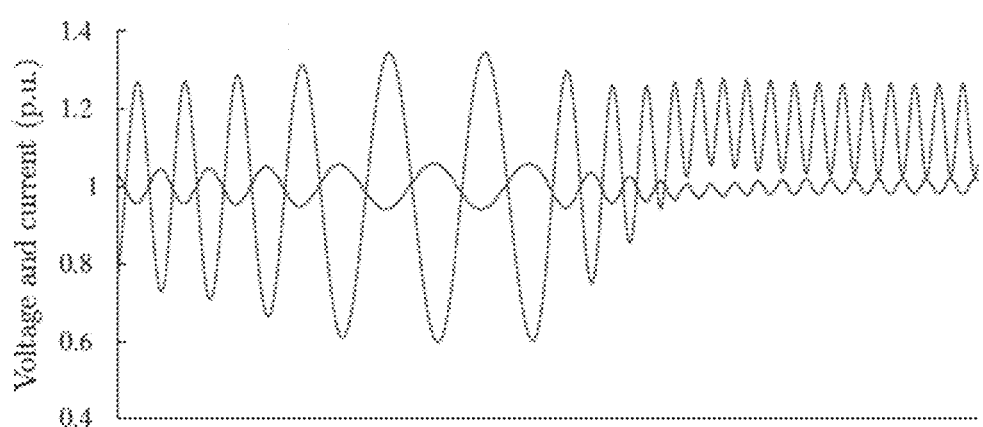
Figure 16D:
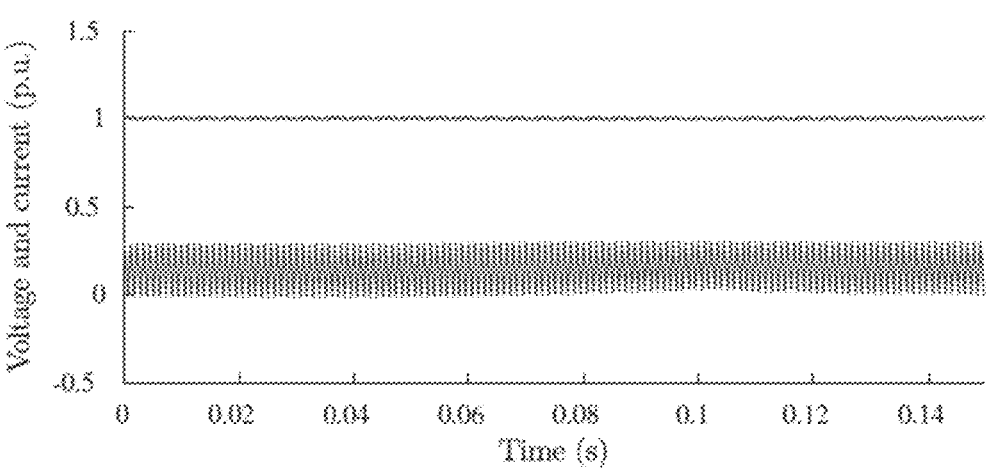

Results from the constant force and torque simulation are shown in FIGS. 16A to 16D. Here, the suspension current reference is held constant at the value required to support the shaft's weight while the speed is varied as shown in FIG. 16A. FIG. 16B shows the results using the first power flow configuration. FIG. 16C shows the results using the second power flow configuration. FIG. 16D shows the results using the third power flow configuration. This test clearly depicts the expected undesirable speed response of both the first and the second power flow approaches, while the third power flow approach is not impacted by changes in speed. Also, as expected, the second power flow approach performs better at higher speeds. Note that this simulation was intentionally conducted at a problematically low speed and it is anticipated that for the right high-speed machine configuration, the second power flow approach will exhibit reasonable performance.

Figure 17A:
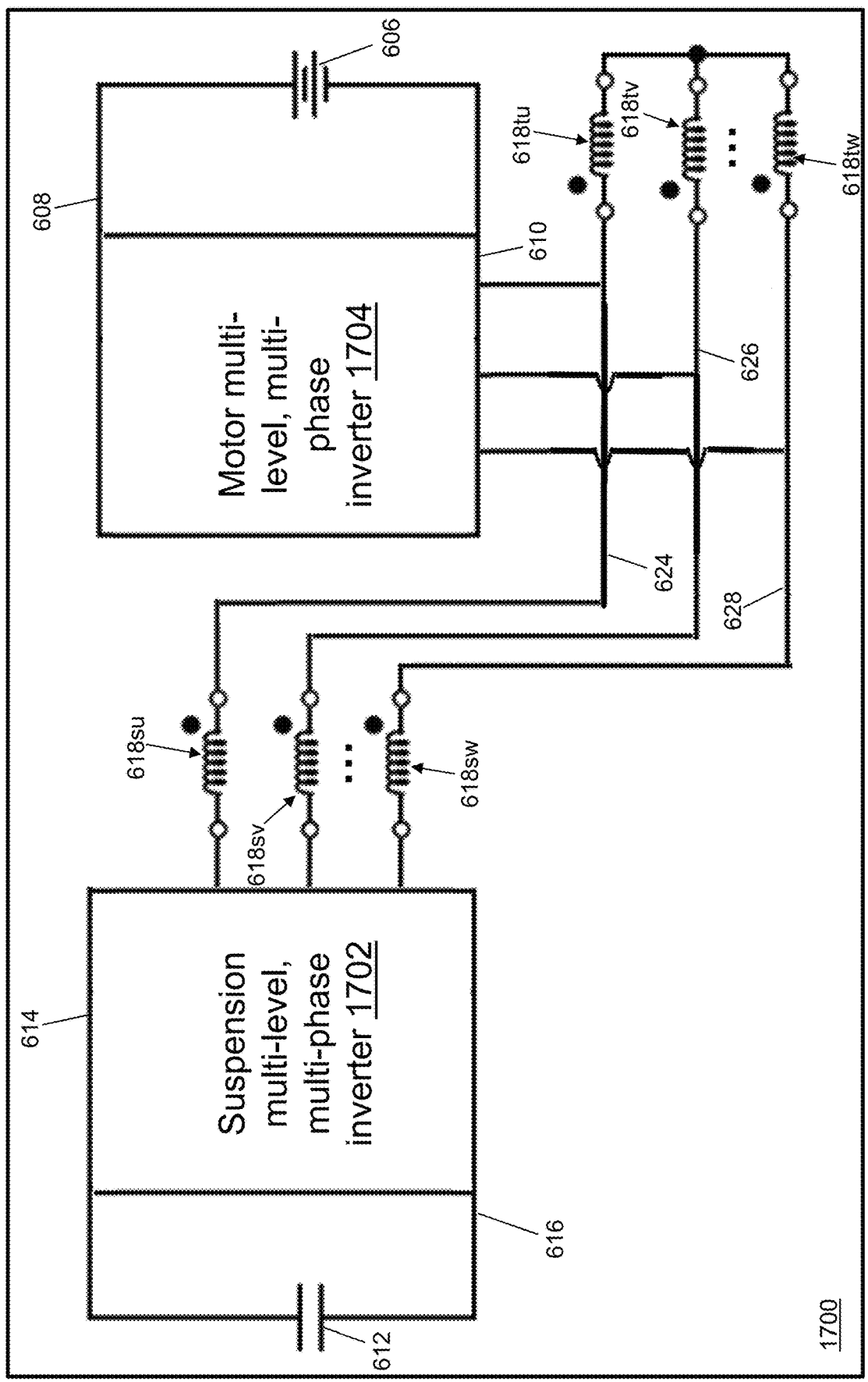
FIG. 17A depicts a block diagram of a second drive for the machine of FIG. 1 in accordance with an illustrative embodiment.

Referring to FIG. 17A, a block diagram of a second drive 1700 of radial flux machine 100 is shown in accordance with an illustrative embodiment. Drive 600 can be replaced with second drive 1700 where suspension inverter 602 and torque inverter 604 have been replaced with suspension multi-level, multi-phase inverter 1702 and with torque multi-level, multi-phase inverter 1704, respectively. Suspension multi-level, multi-phase inverter 1702 and torque multi-level, multi-phase inverter 1704 can provide greater than or equal to two phases and/or greater than or equal to two voltage levels. A winding that includes one or more torque coil(s) and one or more suspension coil(s) is included for each phase.

Figure 17B:
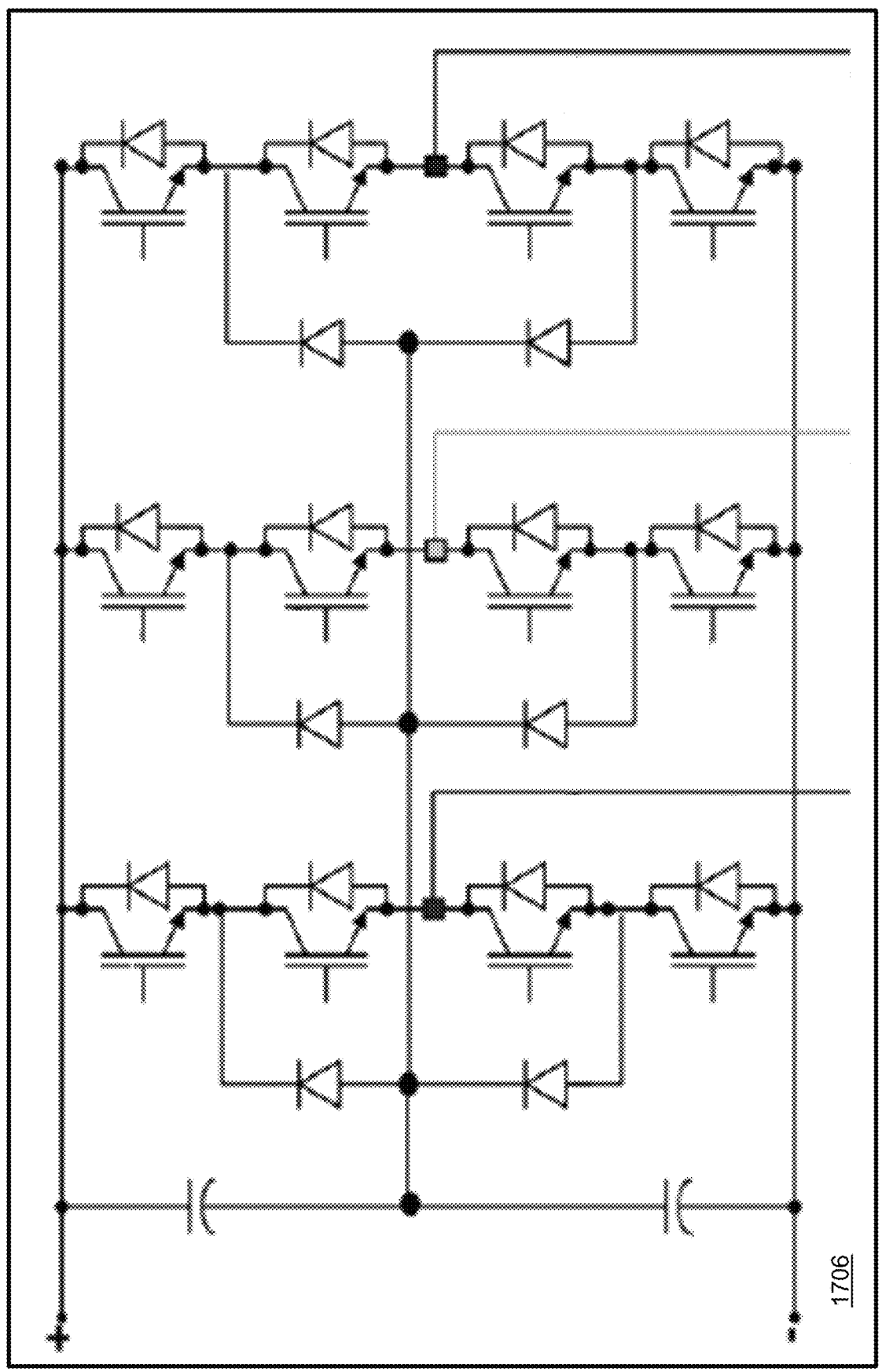
FIG. 17B depicts a circuit diagram of a second inverter of the second drive of FIG. 17A in accordance with an illustrative embodiment.

Referring to FIG. 17B, a circuit diagram of an existing, three-level, three-phase inverter 1706 of second drive 1700 is shown in accordance with an illustrative embodiment. Suspension multi-level, multi-phase inverter 1702 and torque multi-level, multi-phase inverter 1704 can be replaced with three-level, three-phase inverter 1706 in second drive 1700.

Figure 18:
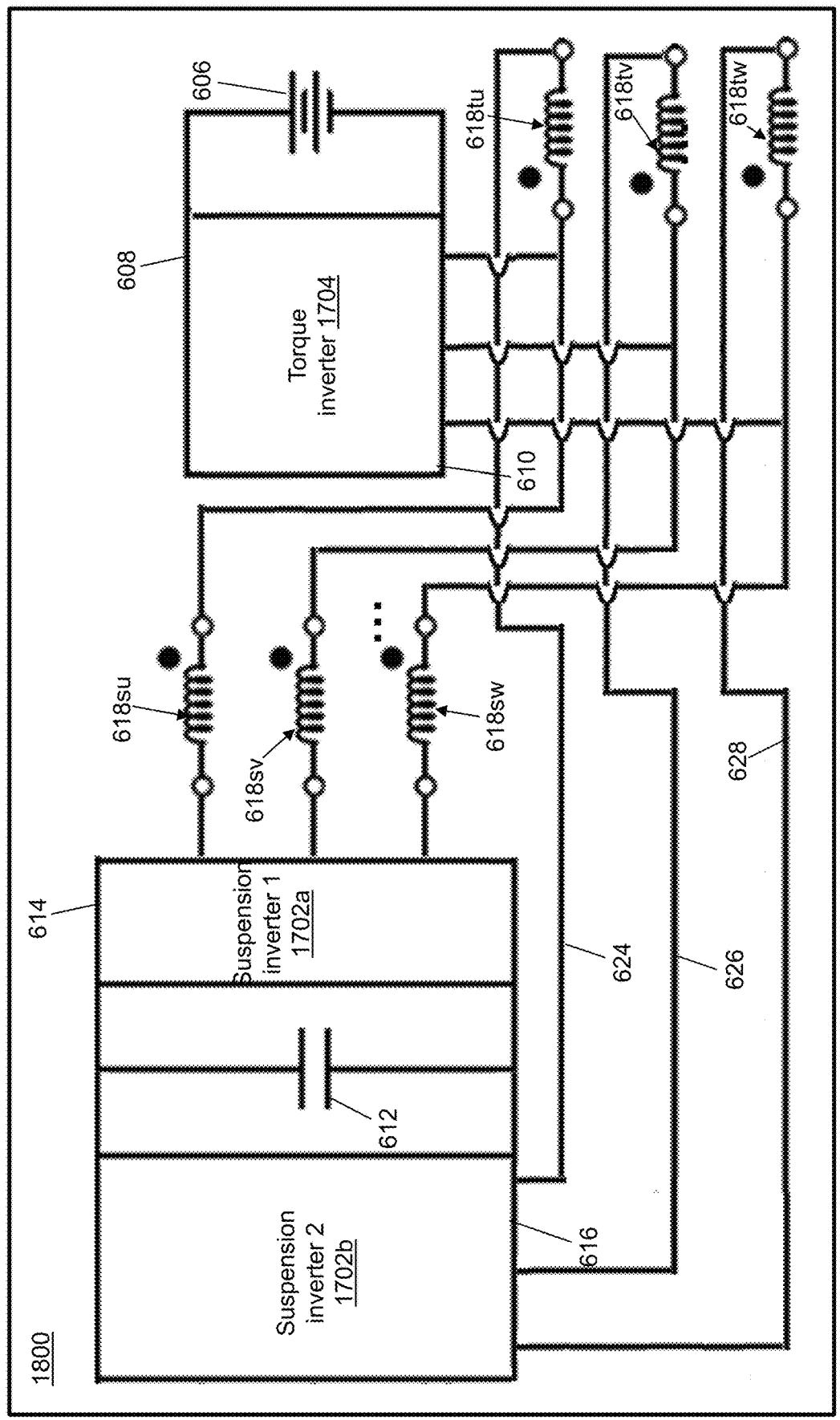
FIG. 18 depicts a circuit diagram of a third drive for the machine of FIG. 1 in accordance with an illustrative embodiment.

Referring to FIG. 18, a circuit diagram of a third drive 1800 for radial flux machine 100 is shown in accordance with an illustrative embodiment. A first suspension inverter 1702a and a second suspension inverter 1702b are shown connected in parallel across capacitor 612.

Figure 19:
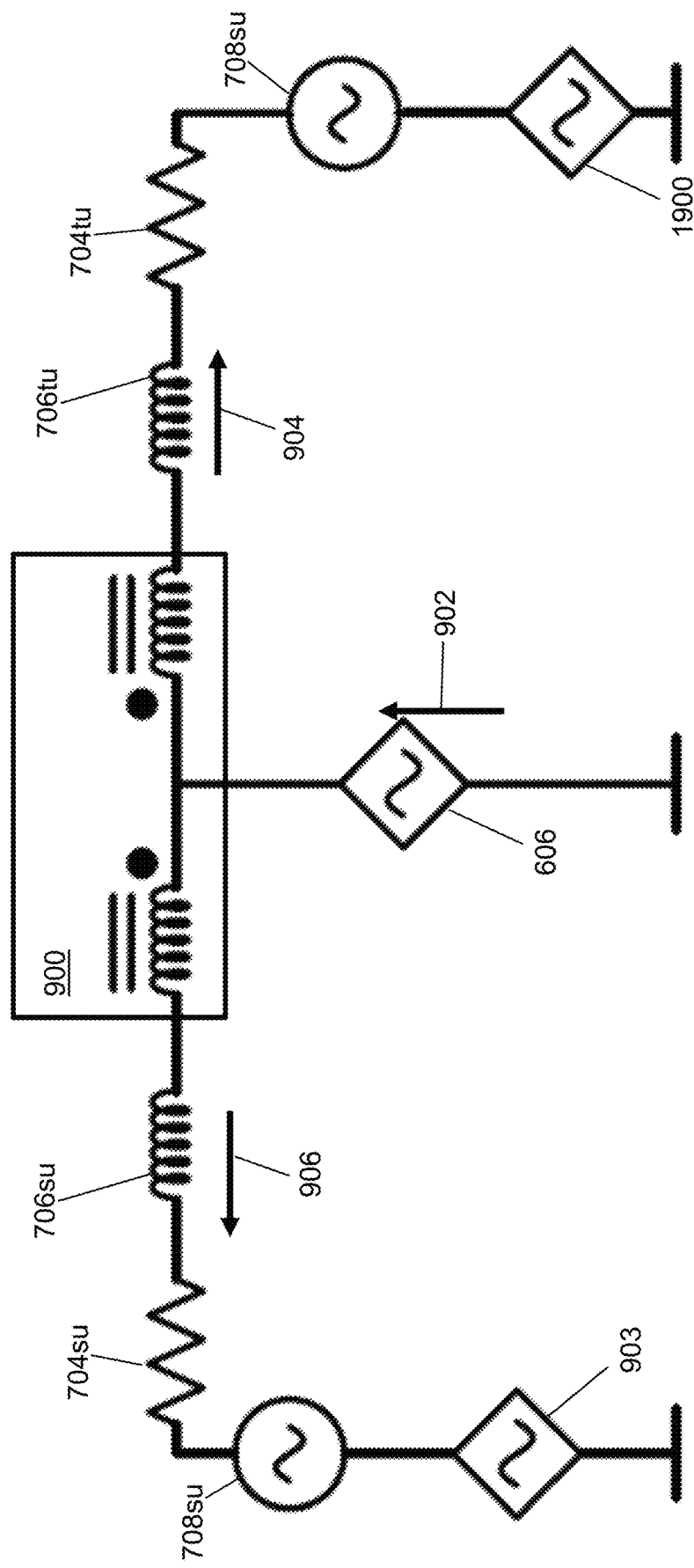
FIG. 19 depicts an equivalent single-phase circuit for the third drive of FIG. 18 in accordance with an illustrative embodiment.

Referring to FIG. 19, an equivalent single-phase circuit for third drive 1800 is shown in accordance with an illustrative embodiment that includes a voltage $v_{s2}$ from second suspension inverter 1702b.

A floating capacitor connected across one or more suspension inverter 604, 1702, 1702a, 1702b to implement a parallel DPNV motor drive reduces the amount of required power electronic hardware and also allows flexibility in a suspension voltage bus value, which is advantageous in terms of losses and force/torque ripple.

As used herein, the term "mount" includes join, unite, connect, couple, associate, insert, hang, hold, affix, attach, fasten, bind, paste, secure, hinge, bolt, screw, rivet, solder, weld, glue, form over, form in, layer, mold, rest on, rest against, abut, and other like terms. The phrases "mounted on", "mounted to", and equivalent phrases indicate any interior or exterior portion of the element referenced. These phrases also encompass direct mounting (in which the referenced elements are in direct contact) and indirect mounting (in which the referenced elements are not in direct contact, but are connected through an intermediate element) unless specified otherwise. Elements referenced as mounted to each other herein may further be integrally formed together, for example, using a molding or thermoforming process as understood by a person of skill in the art. As a result, elements described herein as being mounted to each other need not be discrete structural elements unless specified otherwise. The elements may be mounted permanently, removably, or releasably unless specified otherwise.

Use of directional terms, such as top, bottom, right, left, front, back, upper, lower, horizontal, vertical, behind, etc. are merely intended to facilitate reference to the various surfaces of the described structures relative to the orientations introduced in the drawings and are not intended to be limiting in any manner unless otherwise indicated.

As used in this disclosure, the term "connect" includes join, unite, mount, couple, associate, insert, hang, hold, affix, attach, fasten, bind, paste, secure, bolt, screw, rivet, pin, nail, clasp, clamp, cement, fuse, solder, weld, glue, form over, slide together, layer, and other like terms. The phrases "connected on" and "connected to" include any interior or exterior portion of the element referenced. Elements referenced as connected to each other herein may further be integrally formed together. As a result, elements described herein as being connected to each other need not be discrete structural elements. The elements may be connected permanently, removably, or releasably.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A machine drive comprising:
   a suspension force inverter configured to provide a plurality of suspension force electrical signals to a plurality of suspension force electrical terminals, wherein each suspension force electrical terminal is configured for connection to a suspension coil of a stator winding, wherein each suspension force electrical signal of the plurality of suspension force electrical signals is configured to provide a phase of a plurality of phases to a single suspension force electrical terminal of the plurality of suspension force electrical terminals, wherein a single stator winding is associated with each phase the plurality of phases;

a torque inverter configured to provide a plurality of torque electrical signals to a plurality of torque electrical terminals, wherein each torque electrical signal of the plurality of torque electrical signals provides the phase of the plurality of phases to a single torque electrical terminal of the plurality of torque electrical terminals, wherein each torque electrical terminal is configured for connection to both the suspension coil and a torque coil of the single stator winding of the associated phase; and a capacitor connected in parallel across an input of the suspension force inverter opposite the plurality of suspension force electrical terminals, wherein the torque inverter is configured for connection to a voltage source, wherein neither the capacitor nor the suspension force inverter is configured for a direct connection to any voltage source, wherein the capacitor is connected to the voltage source through the torque invertor and the suspension force inverter.

2. The machine drive of claim 1, wherein the suspension force inverter is connected between a first wire and a second wire, wherein the capacitor is connected in parallel across the suspension force inverter between the first wire and the second wire.

3. The machine drive of claim 2, wherein the torque inverter is connected between a third wire and a fourth wire, wherein the voltage source is connected in parallel across the torque inverter between the third wire and the fourth wire.

4. The machine drive of claim 3, wherein the third wire and the fourth wire are not directly connected to the first wire and the second wire.

5. A bearingless electrical machine comprising:

a rotor;

a stator comprising a plurality of teeth, wherein a slot is positioned between a pair of the plurality of teeth, and further wherein the stator is mounted on a first side of the rotor separated by an air gap between a surface of the rotor and a tooth of the plurality of teeth;

a stator winding for each phase of a plurality of phases, wherein each stator winding is wound about the plurality of teeth to form a first number of pole pairs between a first pair of terminals for each phase of the plurality of phases and to form a second number of pole pairs between a second pair of terminals for each phase of the plurality of phases, wherein $p_s=1$ or $p_s=p\pm1$, where p is the first number of pole pairs and $p_s$ is the second number of pole pairs, wherein a torque coil of the stator winding for each phase of the plurality of phases is connected between the first pair of terminals for a respective phase of the plurality of phases, wherein a suspension coil of the stator winding for each phase of the plurality of phases is connected between the second pair of terminals for the respective phase of the plurality of phases; and a machine drive comprising a suspension force inverter configured to provide a suspension force electrical signal for each phase of the plurality of phases to the suspension coil of the stator winding for the respective phase of the plurality of phases, wherein a plurality of suspension force electrical terminals comprise a first terminal of the second pair of terminals for each phase of the plurality of phases;

a torque inverter configured to provide a torque electrical signal for each phase of the plurality of phases to the torque coil and to the suspension coil of the stator winding for the respective phase of the plurality of phases; and a capacitor connected in parallel across an input of the suspension force inverter opposite the plurality of suspension force electrical terminals, wherein the torque inverter is configured for connection to a voltage source, wherein neither the capacitor nor the suspension force inverter is configured for a direct connection to any voltage source, wherein the capacitor is connected to the voltage source through the torque invertor and the suspension force inverter.

6. The bearingless electrical machine of claim 5, wherein the suspension force inverter is configured to provide a plurality of voltage levels for each phase of the plurality of phases.

7. The bearingless electrical machine of claim 6, wherein the torque inverter is configured to provide a second plurality of voltage levels for each phase of the plurality of phases.

8. The bearingless electrical machine of claim 5, wherein the suspension force electrical signal for each phase of the plurality of phases is provided to the first terminal of the second pair of terminals that is a negative terminal.

9. The bearingless electrical machine of claim 5, wherein each torque electrical terminal is configured for connection to a positive side of the suspension coil of the stator winding and to a positive side of the torque coil of the stator winding.

10. The bearingless electrical machine of claim 9, wherein a negative side of the torque coil of the stator winding for each phase of the plurality of phases is connected to a common neutral connector.

11. The bearingless electrical machine of claim 5, wherein the suspension coil includes a plurality of coils connected in series.

12. The bearingless electrical machine of claim 11, wherein the torque coil includes a second plurality of coils connected in series.

13. The bearingless electrical machine of claim 5, further comprising:

a second suspension force inverter configured to provide a second suspension force electrical signal for each phase of the plurality of phases to the suspension coil of the stator winding for the respective phase of the plurality of phases;

wherein the capacitor is connected in parallel across the second suspension force inverter.

14. A bearingless electrical machine system comprising:

a shaft configured to rotate;

a rotor mounted to the shaft to rotate with the shaft;

a stator comprising a plurality of teeth, wherein a slot is positioned between a pair of the plurality of teeth, and further wherein the stator is mounted on a first side of the rotor separated by an air gap between a surface of the rotor and a tooth of the plurality of teeth;

a stator winding for each phase of a plurality of phases, wherein each stator winding is wound about the plurality of teeth to form a first number of pole pairs between a first pair of terminals for each phase of the plurality of phases and to form a second number of pole pairs between a second pair of terminals for each phase of the plurality of phases, wherein $p_s=1$ or $p_s=p\pm1$, where p is the first number of pole pairs and $p_s$ is the second number of pole pairs, wherein a torque coil of the stator winding for each phase of the plurality of phases is connected between the first pair of terminals for a respective phase of the plurality of phases, wherein a suspension coil of the stator winding for each phase of the plurality of phases is connected between the second pair of terminals for the respective phase of the plurality of phases;

a machine drive comprising a suspension force inverter configured to provide a suspension force electrical signal for each phase of the plurality of phases to the suspension coil of the stator winding for the respective phase of the plurality of phases, wherein a plurality of suspension force electrical terminals comprise a first terminal of the second pair of terminals for each phase of the plurality of phases;

a torque inverter configured to provide a torque electrical signal for each phase of the plurality of phases to the torque coil and to the suspension coil of the stator winding for the respective phase of the plurality of phases; and a capacitor connected in parallel across an input of the suspension force inverter opposite the plurality of suspension force electrical terminals, wherein the torque inverter is configured for connection to a voltage source, wherein neither the capacitor nor the suspension force inverter is configured for a direct connection to any voltage source, wherein the capacitor is connected to the voltage source through the torque invertor and the suspension force inverter; and a motor controller comprising a processor configured to determine the suspension force electrical signal input to the suspension force inverter to regulate a voltage on the capacitor to provide a power flow into the suspension coil of the stator winding for each phase of the plurality of phases to maintain the air gap between the rotor and the stator.

15. The bearingless electrical machine system of claim 14, wherein the processor is further configured to determine the torque electrical signal input to the torque inverter that provides a second power flow into the torque coil and into the suspension coil of the stator winding for each phase of the plurality of phases to both maintain the air gap between the rotor and the stator and generate a torque on the shaft.

16. The bearingless electrical machine system of claim 14, wherein the power flow is computed using $\langle P_{TS} \rangle = \frac{1}{2} v_f i_f$, where $P_{TS}$ is a power flowing from the torque inverter to the suspension inverter, $v_f$ is a voltage defined at a different rotating frequency than an operational frequency generated by the torque inverter on each stator winding, and $i_f$ is a current defined at the different rotating frequency.

17. The bearingless electrical machine system of claim 14, wherein the power flow is computed using $\langle P_{TS} \rangle = \frac{1}{2} v_s i_0$, where $P_{TS}$ is a power flowing from the torque inverter to the suspension inverter, $v_s$ is a suspension coil voltage on each stator winding, $i_0 = 2i_s$, where $i_s$ is a suspension coil current on each stator winding.

18. The bearingless electrical machine system of claim 14, wherein the power flow is computed using $\langle P_{TS} \rangle = \frac{1}{2} v_s i_d$, where $P_{TS}$ is a power flowing from the torque inverter to the suspension inverter, $v_s$ is a suspension coil voltage on each stator winding, $i_d = 2i_s \cos \phi_z$, where $i_s$ is a suspension coil current on each stator winding, and $\phi_z$ is an angle of $\bar{z}$, where $$\bar{Z} = \frac{\vec{v}_s}{\vec{i}_s}.$$

19. The bearingless electrical machine system of claim 14, wherein the suspension force electrical signal for each phase of the plurality of phases is provided to the first terminal of the second pair of terminals that is a negative terminal.

20. The bearingless electrical machine system of claim 14, wherein each torque electrical terminal is configured for connection to a positive side of the suspension coil of the stator winding and to a positive side of the torque coil of the stator winding.

* * * * *

UNITED STATES PATENT AND TRADEMARK OFFICE
CERTIFICATE OF CORRECTION

PATENT NO. : 10,879,829 B2
APPLICATION NO. : 16/414880
DATED : December 29, 2020
INVENTOR(S) : Eric Loren Severson It is certified that error appears in the above-identified patent and that said Letters Patent is hereby corrected as shown below:

In the Specification

Column 17, Lines 43-44:
Delete the phrase "($\omega_x = d\phi_k/dt = d\theta_{du}/dt$)." and replace with --($\omega_s = d\phi_k/dt = d\theta_{du}/dt$).--.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*